(12) United States Patent
Ichikawa et al.

(10) Patent No.: US 7,056,365 B2
(45) Date of Patent: Jun. 6, 2006

(54) HONEYCOMB STRUCTURE, AND HONEYCOMB FILTER AND CONVERTER SYSTEM BOTH USING THE SAME

(75) Inventors: Yukihito Ichikawa, Nagoya (JP); Yasushi Kato, Nagoya (JP); Masato Ogawa, Komaki (JP)

(73) Assignee: NGK Insulators, Ltd., Nagoya (JP)

( * ) Notice: Subject to any disclaimer, the term of this patent is extended or adjusted under 35 U.S.C. 154(b) by 252 days.

(21) Appl. No.: 10/475,331

(22) PCT Filed: Apr. 26, 2002

(86) PCT No.: PCT/JP02/04236

§ 371 (c)(1),
(2), (4) Date: Oct. 21, 2003

(87) PCT Pub. No.: WO02/089979

PCT Pub. Date: Nov. 14, 2002

(65) Prior Publication Data

US 2004/0123573 A1    Jul. 1, 2004

(30) Foreign Application Priority Data

May 2, 2001    (JP) .............................. 2001-135631

(51) Int. Cl.
*B01D 46/00* (2006.01)
(52) U.S. Cl. ...................... 55/523; 55/282.2; 55/282.3; 55/385.3; 55/DIG. 10; 55/DIG. 30; 60/297; 60/299; 60/311; 428/116; 428/188; 502/439
(58) Field of Classification Search ............... 55/282.2, 55/282.3, 385.3, 523, DIG. 10, DIG. 30; 428/116, 117, 118, 188; 60/282, 297, 299, 60/301, 311; 502/439
See application file for complete search history.

(56) References Cited

U.S. PATENT DOCUMENTS

| | | | | |
|---|---|---|---|---|
| 4,233,351 A | * | 11/1980 | Okumura et al. ........... | 502/439 |
| 4,810,554 A | * | 3/1989 | Hattori et al. ................ | 55/523 |
| 5,456,965 A | * | 10/1995 | Machida et al. ............ | 428/116 |
| 6,391,421 B1 | * | 5/2002 | Bruck et al. ................ | 428/116 |
| 6,656,564 B1 | * | 12/2003 | Ichikawa et al. ............. | 55/523 |
| 6,764,743 B1 | * | 7/2004 | Kato et al. .................... | 55/523 |
| 6,902,599 B1 | * | 6/2005 | Bardon ........................ | 55/523 |

FOREIGN PATENT DOCUMENTS

EP    0 796 830 A1    9/1997

(Continued)

*Primary Examiner*—Jason M. Greene
(74) *Attorney, Agent, or Firm*—Oliff & Berridge, PLC

(57) ABSTRACT

A honeycomb structure in which a plurality of through-holes 3 extending in the axial direction are formed by a plurality of partition walls 1 and 2, wherein the plurality of partition walls 1 and 2 are constituted by a plurality of partition walls having different thicknesses and, of the plurality of partition walls having different thicknesses, those partition walls 2 having a thickness larger than the average thickness of all partition walls are provided at a higher proportion in a particular portion of the honeycomb structure whole portion having partition walls than in other portion. This honeycomb structure, and a honeycomb filter and a converter system both using the honeycomb structure satisfy recent years' requirements of improvement in warm-up property connected with purification ability and reduction in harmful substance emitted right after engine start, and yet have a sufficient mechanical strength to external pressure, a high erosion resistance and a high thermal shock resistance.

20 Claims, 14 Drawing Sheets

FOREIGN PATENT DOCUMENTS

| | | |
|---|---|---|
| EP | 0 867 222 A2 | 9/1998 |
| GB | 2 071 640 A | 9/1981 |
| JP | A 54-110189 | 8/1979 |
| JP | U 58-19743 | 8/1983 |
| JP | U 61-113915 * | 7/1986 |
| JP | 5-166834 * | 7/1993 |
| JP | A 5-168834 | 7/1993 |
| JP | A 9-276960 | 10/1997 |
| JP | A 2000-051710 | 2/2000 |
| JP | A 2000-342920 | 12/2000 |
| WO | WO 98/33593 | 8/1998 |

\* cited by examiner

HONEYCOMB STRUCTURE, AND HONEYCOMB FILTER AND CONVERTER SYSTEM BOTH USING THE SAME

TECHNICAL FIELD

The present invention relates to a honeycomb structure, etc. More particularly, the present invention relates to a honeycomb structure, etc., all of which have a high resistance to the erosion caused by, for example, foreign matter present in exhaust gas and which can exhibit all of warm-up property connected with purification ability, mechanical strength to external pressure, and thermal shock resistance to thermal load, at desired levels.

BACKGROUND ART

In recent years, as the regulation for exhaust gas has become stronger, honeycomb structures having a higher purification ability for exhaust gas have come to be required, and it is being actively tried to improve the warm-up property connected with the purification ability, of a honeycomb structure having a catalyst loaded on the partition walls, by making smaller the thicknesses of the catalyst-loaded partition walls and consequently reducing the heat capacity of the catalyst. The requirement for improvement of purification ability is increasing year by year and honeycomb structures having wall thicknesses as small as about 0.1 to 0.2 mm are currently in use as a mainstream while honeycomb structures having wall thicknesses of even 0.1 mm or less have come to be used partially. Such requirement for thin partition wall is considered to become even severer in future.

It is also being actively tried to mount a converter system comprising a honeycomb structure having a catalyst loaded on the partition walls, right below an exhaust manifold to quickly activate the catalyst loaded on the partition walls of the honeycomb structure, by a high-temperature exhaust gas and reduce the amount of a harmful substance emitted right after engine start.

When a converter system comprising a honeycomb structure employing thin partition walls is mounted right below an exhaust manifold in response to such a requirement, however, there arises an erosion phenomenon that the end face of honeycomb structure is scooped out by foreign matter in exhaust gas (which is mostly particulate substances of various particle diameters, derived from, for example, a material composing the exhaust manifold and a welding material used in production of the exhaust manifold). This erosion phenomenon has become an important problem.

This erosion phenomenon is important for the following reasons. The erosion phenomenon invites the detaching of catalyst at the exhaust gas-injected end face of honeycomb structure and subsequent reduction in catalytic activity; in some cases, the erosion proceeds rapidly, does not stay at the vicinity of honeycomb structure end face alone, and develops deep into the honeycomb inside, leading to the fracture of honeycomb structure. Further, when the outer peripheral portion of honeycomb structure and its vicinity are damaged severely by the erosion phenomenon, the mat material used for holding the honeycomb structure inside a converter case is exposed; as a result, the mat material is scattered by injection of exhaust gas, and the scattered mat material may become foreign matter and further damage the honeycomb structure.

Such an erosion phenomenon is attributed to the above-mentioned recent years' requirements, specifically the matters described in the following (1) and (2). A means is strongly needed which satisfies requirements of improvement in warm-up property connected with purification ability and reduction in the amount of harmful substance emitted right after engine start and yet can give a higher erosion resistance.

(1) Ordinarily, in a honeycomb structure having thin partition walls, the fracture strength to external force is low and, in particular, the fracture strength of each partition wall is influenced directly by the wall thickness. Therefore, a smaller wall thickness results in a lower fracture strength of each partition wall.

(2) When a converter system is mounted right below an exhaust manifold, as compared to conventional below-floor mounting, the honeycomb structure thereof is exposed to an exhaust gas of higher temperature and higher pressure. Therefore, the honeycomb structure undergoes a lager thermal load (e.g. a larger thermal shock) and moreover tends to be influenced by the drifting and pulsation of exhaust gas.

In order to increase the strength of honeycomb structure, there was proposed a honeycomb structure wherein relatively thick partition walls and relatively thin partition walls are provided uniformly [JP(U)-A-58-19743]. There was also proposed a honeycomb structure wherein the thicknesses of partition walls are made smaller regularly towards the center of honeycomb structure to ensure the fracture strength of whole honeycomb structure to external force and further there are employed a larger contact area and a shorter warm-up time to improve the purification ability (JP-A-54-110189).

These honeycomb structures, however, were produced for below-floor mounting, and no consideration was made to the above-mentioned recent years' requirements of thinner partition walls of honeycomb structure and mounting of converter system right below exhaust manifold, or to the erosion phenomenon arising in connection with these requirements.

Therefore, these honeycomb structures were unable to actually improve the warm-up property connected with purification ability while exhibiting a high erosion resistance.

Further, in the honeycomb structure of JP(U)-A-58-19743, since relatively thick partition walls and relatively thin partition walls are provided uniformly, the strength of whole structure is made larger but there was also a problem of reduced thermal shock resistance.

Meanwhile, there was proposed a honeycomb structure wherein the thickness of partition walls is made larger only at the structure end at which an exhaust gas is introduced, for improvement in erosion resistance (JP-A-2000-51710).

In this honeycomb structure as well, no consideration was made to that the erosion phenomenon arising in connection with the above-mentioned recent years' requirements of thinner partition walls of honeycomb structure and mounting of converter system right below exhaust manifold is seen mostly only at the particular area of honeycomb structure end.

Further, since each partition wall has a thick portion and a thin portion pr se, a thermal stress tends to concentrate at the boundary of the thick portion and the thin portion and therefore no sufficient thermal shock resistance could be obtained.

The present invention has been made in view of the above problems. The present invention aims at providing a honeycomb structure, etc. all of which satisfy recent years' requirements of improvement in warm-up property connected with purification ability and reduction in the amount of harmful substance emitted right after engine start and yet have a sufficient mechanical strength to external pressure, a high erosion resistance and a high thermal shock resistance.

DISCLOSURE OF THE INVENTION

The present inventors made an intensive study in order to achieve the above aim. As a result, the present inventors first found that, with respect to the mechanism of the erosion of honeycomb structure, out of the following possible factors, the factors (1) to (3) are main factors of the erosion.

(1) Foreign matter having very small particle diameters collides with partition walls of honeycomb structure and damages them; it is repeated; thereby, erosion is invited.

(2) Partition walls are damaged by fragments of damaged partition walls; this also invites erosion.

(3) Foreign matter having very large particle diameters collides with partition walls and damages them; further, such foreign matter slides on the end face of honeycomb structure, resulting in scooping-out of the end surface.

(4) There may also appear microcracks caused by thermal shock, or wind erosion caused by the shock wave brought about by pulsation of exhaust gas.

Next, with respect to the causes of erosion of honeycomb structure, the present inventors found the followings.

(1) An exhaust manifold, when produced in one piece using cast iron, undergoes oxidation at the inner wall surface during the use, to form an oxide scale and become fragile; this oxide scale is peeled by an exhaust gas flow and becomes foreign matter having particle diameters of several tens of μm; the foreign matter is carried by the exhaust gas flow and arrives at a honeycomb structure.

(2) When an exhaust manifold is produced by subjecting a stainless steel thin sheet to welding, its inner wall surface is hardly oxidized and, therefore, formation of oxide scale occurs hardly as compared with when the exhaust manifold is produced using cast iron; however, detached materials derived from spatters which have adhered on the inner wall surface of exhaust manifold during welding, or from welds such as welding beads and the like (the detached materials, when derived from spatters, have particle diameters of 1 mm to several mm and, when derived from welding beads, may have relatively small particle diameters about equal to those of oxide scale) are carried by an exhaust gas flow and arrive at a honeycomb structure.

The reason why an exhaust manifold is produced using stainless steel, is as follows. An exhaust manifold of light weight and small heat capacity can be produced; the light weight can contribute to an improved fuel consumption of automobile and the small heat capacity can prevent the lowering of exhaust gas temperature and promote the early activation of catalyst.

Further, with respect to the converter system which is currently in main use, the present inventors made an intensive study on a relation between the manner in which the converter system is provided relative to an exhaust manifold and the erosion of the honeycomb structure. As a result, the followings were found.

(1) In a converter system as shown in FIG. 1 and FIG. 2 wherein the exhaust pipes from the exhaust manifold of each engine cylinder (cylinders of engine are various, for example, two cylinders and four cylinders) are directly connected to the cone section 7 of converter system as exhaust gas inlet pipes 5, an exhaust gas 21 is injected onto a honeycomb structure 10 at a high speed without making no substantial spread. Moreover, from, for example, the necessity of exact measurement by oxygen sensor, most exhaust pipes 5 are provided, as shown in FIG. 1, so that exhaust gases 21 discharged from exhaust pipes 5 intersect each other and are injected concentratedly onto the central area of the end face of honeycomb structure 10, or, as shown in FIG. 2, so that exhaust gases 21 intersect each other before their arrival at the end face of honeycomb structure and are injected concentratedly onto the area of the honeycomb structure end face near the outer peripheral area of end face. Therefore, in this type of converter system, erosion appears concentratedly on the central area of the exhaust gas-injected end face of honeycomb structure 10, or on the area of end face near the outer peripheral area.

(2) In a converter system as shown in FIG. 3 and FIG. 4 wherein a single pipe formed by convergence of exhaust pipes of exhaust manifolds is connected to the cone section 7 of converter system as an exhaust gas inlet pipe 5, an exhaust gas 21 spreads along the cone section 7 and is injected onto the whole area of the exhaust gas-injected end face of honeycomb structure 10. Further, the exhaust gas 21 has the largest speed at the center of its flow; however, foreign matter flows irregularly in the exhaust gas and arrives at the end face of honeycomb structure 10 irregularly.

As shown in FIG. 4, in a converter system having an exhaust gas inlet pipe 5 above the central area of exhaust gas-injected end face of honeycomb structure, foreign matter arriving at the end face at a high speed collides with the partition walls of the central area of end face at a small angle; therefore, the energy of collision is small and the amount of erosion generated is small as well. Meanwhile, the portion of exhaust gas arriving at the area of honeycomb structure end face near the periphery of the end face flows backward, after arriving at the end face of honeycomb structure 10, along the inner surface of a cone section 7, is carried by the exhaust gas and arrives again at the end face. Therefore, the amount of erosion generated is large at the area of end face near the periphery of end face.

As shown in FIG. 3(a), in a converter system having an exhaust gas inlet pipe 5 obliquely above relative to the exhaust gas-injected end face of honeycomb structure, foreign matter arriving at the end face at a high speed collides with the partition walls of the central area of end face at a large angle; therefore, the energy of collision is large and the amount of erosion generated is large at the central area of end face.

As shown in FIG. 3(b), the foreign matter in an exhaust gas 21 which has arrived at the end face of honeycomb structure 10 from obliquely upward, collides with the inner surface of a cone section 7 and is diverged, slides on the area of end face near the periphery of end face in the circumferential direction of end face, is carried by the flow of exhaust gas and again passes (slides on) the central area of end face. Therefore, the amount of erosion generated is large at the area of end face near the periphery of end face and at the central area of end face.

Based on the above findings, the present inventors found that the problems of conventional honeycomb structures can be solved by providing thick partition walls at a high proportion so as to correspond to a particular area of end face (an exhaust gas-injected area and a foreign matter-sliding area) while providing thin partition walls at a high proportion so as to correspond to the area of end face other than the exhaust gas-injected area. This finding has led to the completion of the present invention.

The present inventors also found that even when the exhaust gas-injected area of honeycomb structure end face and the foreign matter-sliding area of the end face are not restricted to a particular area, the problems of conventional honeycomb structures can be solved by providing partition walls of different thicknesses irregularly. This finding has led to the completion of the present invention.

According to the present invention, there is provided a honeycomb structure in which a plurality of through-holes extending in the axial direction are formed by a plurality of partition walls, characterized in that the plurality of partition walls are constituted by a plurality of partition walls having different thicknesses, and of the plurality of partition walls having different thicknesses, those partition walls having a thickness larger than the average thickness of all partition walls are provided at a higher proportion in a particular portion of the honeycomb structure whole portion having partition walls than in other portion. (This honeycomb structure is hereinafter referred to as "first honeycomb structure" in some cases.)

For the first honeycomb structure of the present invention, there can be mentioned the following specific embodiments.

(1) A honeycomb structure in which a plurality of through-holes extending in the axial direction are formed by a plurality of partition walls, characterized in that the plurality of partition walls are constituted by a plurality of partition walls having different thicknesses, and a partition wall group consisting of those partition walls having a thickness larger than the average thickness of all partition walls and those partition walls having a thickness smaller than the average partition wall thickness is provided in a particular portion of honeycomb structure, and a partition wall group consisting only of partition walls having a thickness smaller than the average partition wall thickness is provided in other portion.

(2) A honeycomb structure having a plurality of through-holes divided by a plurality of partition walls and extending in the axial direction, characterized in that the plurality of partition walls are constituted by a plurality of partition walls having different thicknesses, and a partition wall group consisting only of partition walls having a thickness smaller than the average thickness of all partition walls is provided so as to include at least part of the honeycomb structure portion near the outer peripheral portion of honeycomb structure, and a partition wall group consisting only of partition walls having a thickness larger than the average partition wall thickness is provided so as to include the central portion of honeycomb structure located inside the honeycomb portion near the outer peripheral portion of honeycomb structure.

(3) A honeycomb structure in which a plurality of through-holes extending in the axial direction are formed by a plurality of partition walls, characterized in that in the whole portion of honeycomb structure in which the partition walls are provided, those partition walls having a thickness larger than the average thickness of all partition walls and those partition walls having a thickness smaller than the average partition wall thickness are provided in a mixed state, and a partition wall group containing those partition walls having a thickness larger than the average partition wall thickness, relatively in a large amount is provided in a particular portion of honeycomb structure, and a partition wall group containing those partition walls having a thickness smaller than the average partition wall, relatively in a large amount is provided in other portion.

For the honeycomb structure (1), there can be mentioned, as examples of more in-depth embodiments, a honeycomb structure wherein the partition wall group consisting of those partition walls having a thickness larger than the average thickness of all partition walls and those partition walls having a thickness smaller than the average partition wall thickness is provided so as to include at least part of the honeycomb structure portion near the outer peripheral portion of honeycomb structure, and the partition wall group consisting only of partition walls having a thickness smaller than the average partition wall thickness is provided so as to include a honeycomb structure central portion located inside the honeycomb structure portion near the outer peripheral portion of honeycomb structure; and a a honeycomb structure wherein the partition wall group consisting only of partition walls having a thickness smaller than the average partition wall thickness is provided so as to include at least part of the honeycomb structure portion near the outer peripheral portion of honeycomb structure, and the partition wall group consisting of those partition walls having a thickness larger than the average partition wall thickness and those partition walls having a thickness smaller than the average partition wall thickness is provided so as to include a honeycomb structure central portion located inside the honeycomb structure portion near the outer peripheral portion of honeycomb structure.

In the honeycomb structure (2), the plurality of partition walls may have such thicknesses as decrease stepwise or continuously from the central portion of honeycomb structure towards the outer periphery of honeycomb structure. In the honeycomb structure (3), a proportion of the partition walls having a thickness smaller than the average partition wall thickness may increase stepwise or continuously from the central portion of honeycomb structure towards the outer periphery of honeycomb structure. In each of the honeycomb structures (1) to (3), the partition walls having a thickness larger than the average partition wall thickness and the partition walls having a thickness smaller than the average partition wall thickness may be provided irregularly.

On the other hand, according to the present invention, there is provided a honeycomb structure having a plurality of through-holes divided by a plurality of partition walls and extending in the axial direction, characterized in that the plurality of partition walls are constituted by a plurality of partition walls having different thicknesses, and partition walls having a thickness larger than the average thickness of all partition walls and partition walls having a thickness smaller than the average partition wall thickness are provided irregularly. (This honeycomb structure is hereinafter referred to as "second honeycomb structure" in some cases.)

In each of the first and second honeycomb structures, the partition walls having a thickness smaller than the average partition wall thickness or the partition walls having a thickness larger than the average partition wall thickness may be constituted by at least two kinds of partition walls of different thicknesses.

When foreign matter having relatively large particle diameters is generated, of the plurality of partition walls, those partition walls forming, in the honeycomb portion near the outer peripheral portion of honeycomb structure, through-holes located at the positions which a line normal to the outer peripheral surface of honeycomb structure passes, and having an angle of ±20° to the normal line, are preferred to be constituted by partition walls having a thickness larger than the average partition wall thickness. In a converter system wherein an exhaust gas is injected onto an area of honeycomb structure end face ranging from the central area to the outer peripheral area, of the plurality of partition walls, those partition walls forming through-holes located at the positions which a line normal to the outer peripheral surface of honeycomb structure passes, and having an angle of 70 to 110° to the normal line, are preferred to be constituted by partition walls having a thickness larger than the average partition wall thickness.

In each of the honeycomb structures of the present invention, the strength of the whole honeycomb structure can be reinforced by making the thickness of the outer wall of honeycomb structure at least two times those of partition walls. The strength of the whole honeycomb structure can also be reinforced by plugging the inside of the through-holes formed by a partition wall group including partition walls adjacent to the outer wall of honeycomb structure, with the same material as for the honeycomb structure, in extrusion molding, by adjustment of the shape of the molding die used, or by impregnating the partition wall group including partition walls adjacent to the outer wall of honeycomb structure with the same material as for the honeycomb structure or with a different material, to achieve a lower porosity and a higher density.

In each of the honeycomb structures of the present invention, the shapes of the plurality of through-holes, in their sections in their diameter direction are preferred to be at least one of triangle, tetragon, pentagon, hexagon, octagon and circle.

The plurality of partition walls having different thicknesses are preferred to have an average partition wall thickness of 0.10 mm or less. In the plurality of partition walls having different thicknesses, a ratio ($t_2/t_1$) of the largest partition wall thickness ($t_2$) to the smallest partition wall thickness ($t_1$) is preferably 2.00 or less. The ratio of partition wall thicknesses is not so large and is more preferably 1.50 or less from the standpoint of thermal shock resistance, particularly preferably 1.30 or less from the standpoint of moldability of honeycomb structure. Meanwhile, the thickness of thick partition walls needs to be at least 5%, preferably at least 10% larger than that of thin partition walls. When the thickness of thick partition walls is smaller than this, no sufficient improvement in erosion resistance is seen. In extrusion molding, the working accuracy of the slit width of the die used is about 3 to 5%; therefore, even if the whole honeycomb structure is designed so as to have a uniform partition wall thickness, there are mixed, in the honeycomb structure produced actually, relatively thin partition walls and relatively thick partition walls, fluctuating in their thickness at the above accuracy level. Therefore, since a thickness difference of at least the above working accuracy is generated, the ratio of partition wall thicknesses becomes 1.03 or more, preferably 1.05 or more.

In the present invention, the plurality of partition walls of honeycomb structure are preferably loaded with a catalyst component. The resulting honeycomb structure, by plugging, with a plugging agent, the through-holes alternately at each end face of honeycomb structure, can be made into a honeycomb filter.

Further in the present invention, there can be provided a converter system comprising such a honeycomb structure or honeycomb filter, an exhaust gas inlet pipe for introducing an exhaust gas into the honeycomb structure or the like, a case for holding the honeycomb structure or the like or the honeycomb filter, and a cone section which is connected to the case and to which the exhaust gas inlet pipe is connected.

In the first honeycomb structure of the present invention, as described above, the partition walls having a thickness larger than the average thickness of all partition walls are provided at a higher proportion in a particular portion of honeycomb structure corresponding to the exhaust gas-injected area of honeycomb structure end face and/or the area of honeycomb structure end face on which foreign matter in exhaust gas slides. Therefore, the first honeycomb structure has a large resistance to erosion caused by exhaust gas or foreign matter in exhaust gas. Meanwhile, in other area of end face not corresponding to the exhaust gas-injected area of honeycomb structure end face and/or the area of honeycomb structure end face on which foreign matter in exhaust gas slides, the partition walls having thicknesses smaller than the partition wall average thickness are provided at a higher proportion. Therefore, the first honeycomb structure can maintain a good warm-up property and exhibit a high purifiability for exhaust gas. Incidentally, in diesel engine vehicles, since the oxygen content in exhaust gas is higher than in gasoline engine vehicles, the foreign matter derived from oxide scale or oil ash solid component from engine or exhaust manifold arrives at an exhaust gas purification filter in a strikingly large amount; therefore, the filter is required to have a higher resistance to erosion. However, the present honeycomb structure, even when used in an exhaust gas purification filter for collecting and removing diesel fine particles, can exhibit the same excellent effect and accordingly can be used particularly preferably.

In the second honeycomb structure of the present invention, as described above, the partition walls having a thickness larger than the average thickness of all partition walls and the partition walls having a thickness smaller than the average partition wall thickness are provided irregularly. Therefore, the second honeycomb structure can have an effectively improved erosion resistance to the foreign matter colliding with partition walls irregularly. Further, since this irregular arrangement of partition walls can relax the concentration of stress, the second honeycomb structure can have an improved thermal shock resistance.

BRIEF DESCRIPTION OF THE DRAWINGS

FIG. 3(*b*) is a partially perspective view schematically showing the flow of exhaust gas in the converter system of FIG. 3(*a*).

BEST MODE FOR CARRYING OUT THE INVENTION

Figure 1:
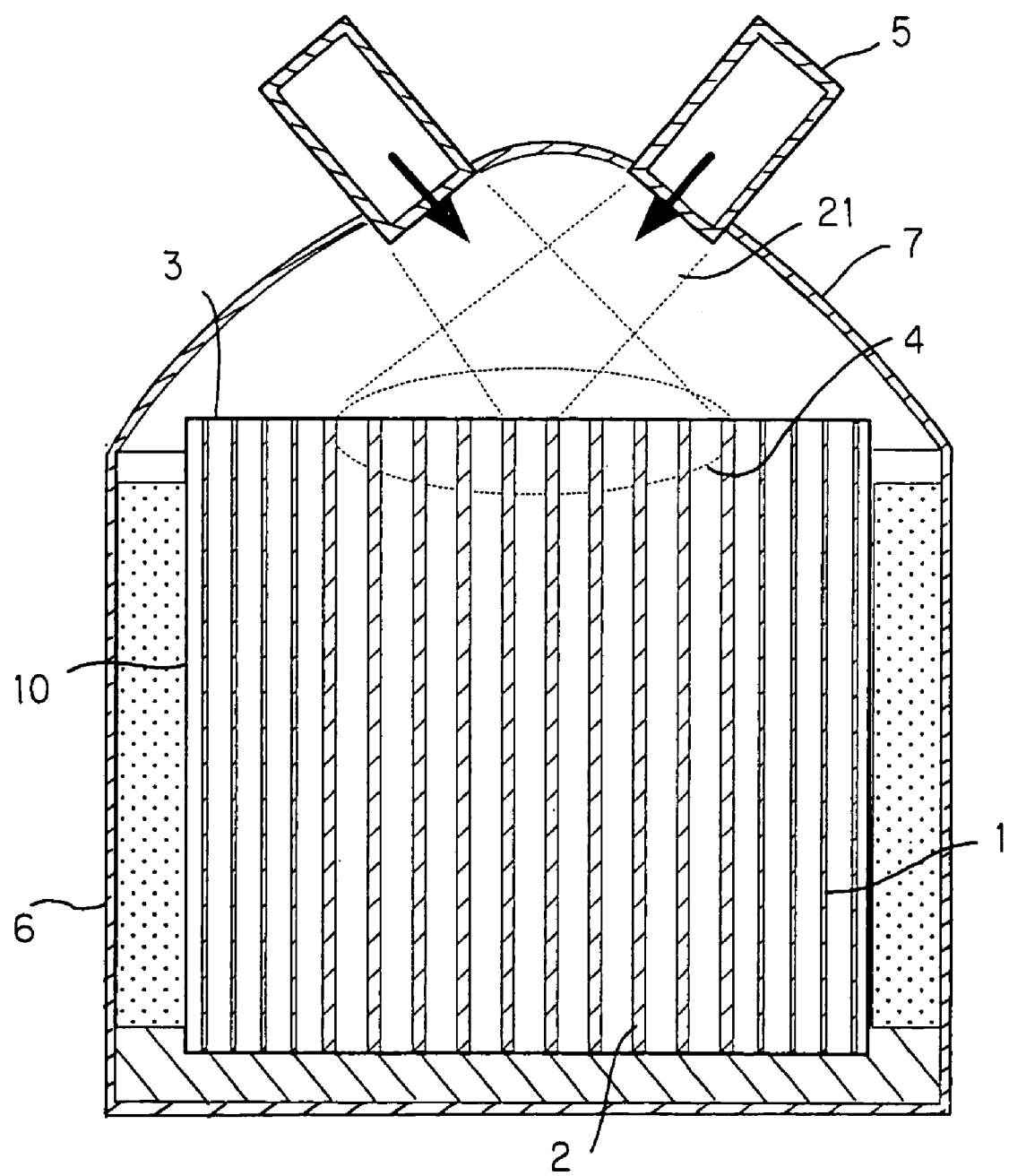
FIG. 1 is a sectional view schematically showing one embodiment of the converter system of the present invention.

Hereinafter, the modes for carrying out the present invention are described specifically with reference to the accompanying drawings.

1. First Honeycomb Structure

As shown in FIGS. 1 to 4, the first honeycomb structure 10 of the present invention is a honeycomb structure 10 in which a plurality of through-holes 3 extending in the axial direction are formed by a plurality of partition walls, wherein the plurality of partition walls are constituted by a plurality of partition walls 1 and 2 having different thicknesses and, of the plurality of partition walls 1 and 2 having different thicknesses, those partition walls 2 having a thickness larger than the average thickness of all partition walls are provided at a higher proportion in a particular portion of honeycomb structure than in other portion.

In the first honeycomb structure 10 of the present invention, as the plurality of through-holes 3, there can be mentioned those having, as the sectional shape in through-hole diameter direction, at least one of triangle, tetragon, pentagon, hexagon, octagon and circle. Of these sectional shapes, there is preferred, for a higher erosion resistance, a higher polygon which has more partition wall intersections and accordingly has a larger shock resistance (for example, a hexagon is preferred to a tetragon), or a circle which is formed by a larger partition wall thickness at partition wall intersections.

The sectional shape of through-holes in diameter direction is preferably a triangle, a pentagon, an octagon or a circle when, as described later, partition walls 1 having a thickness larger than the average thickness of all partition walls are provided in view of the direction of exhaust gas injection; and a hexagon, a octagon or a circle is preferred for enhancement of thermal shock resistance.

In the first honeycomb structure 10 of the present invention, it is sufficient that the plurality of partition walls are constituted by a plurality of partition walls 1 and 2 having different thicknesses and, of the plurality of partition walls 1 and 2 having different thicknesses, those partition walls 1 having a thickness larger than the average thickness of all partition walls are provided at a higher proportion in a particular portion of honeycomb structure corresponding to the exhaust gas-injected area 4 of honeycomb structure end face and/or the honeycomb structure end face area on which foreign matter in exhaust gas slides (the latter area is not shown in FIGS. 1 to 4), than in other portion. Detailed conditions are preferably selected appropriately in view of, for example, required erosion resistance, warm-up property, strength of whole structure, thermal shock resistance, and installed exhaust manifold.

For example, when a high erosion resistance is required, the partition walls 2 having a thickness larger than the average partition wall thickness may be provided at a higher proportion in a portion 4 of honeycomb structure corresponding to the exhaust gas-injected area of honeycomb structure end face, etc. When the requirements for warm-up property, etc. are strong, the partition walls 1 having a thickness smaller than the average partition wall thickness may be provided so as to become a higher proportion in the whole portion of honeycomb structure.

Figure 18:
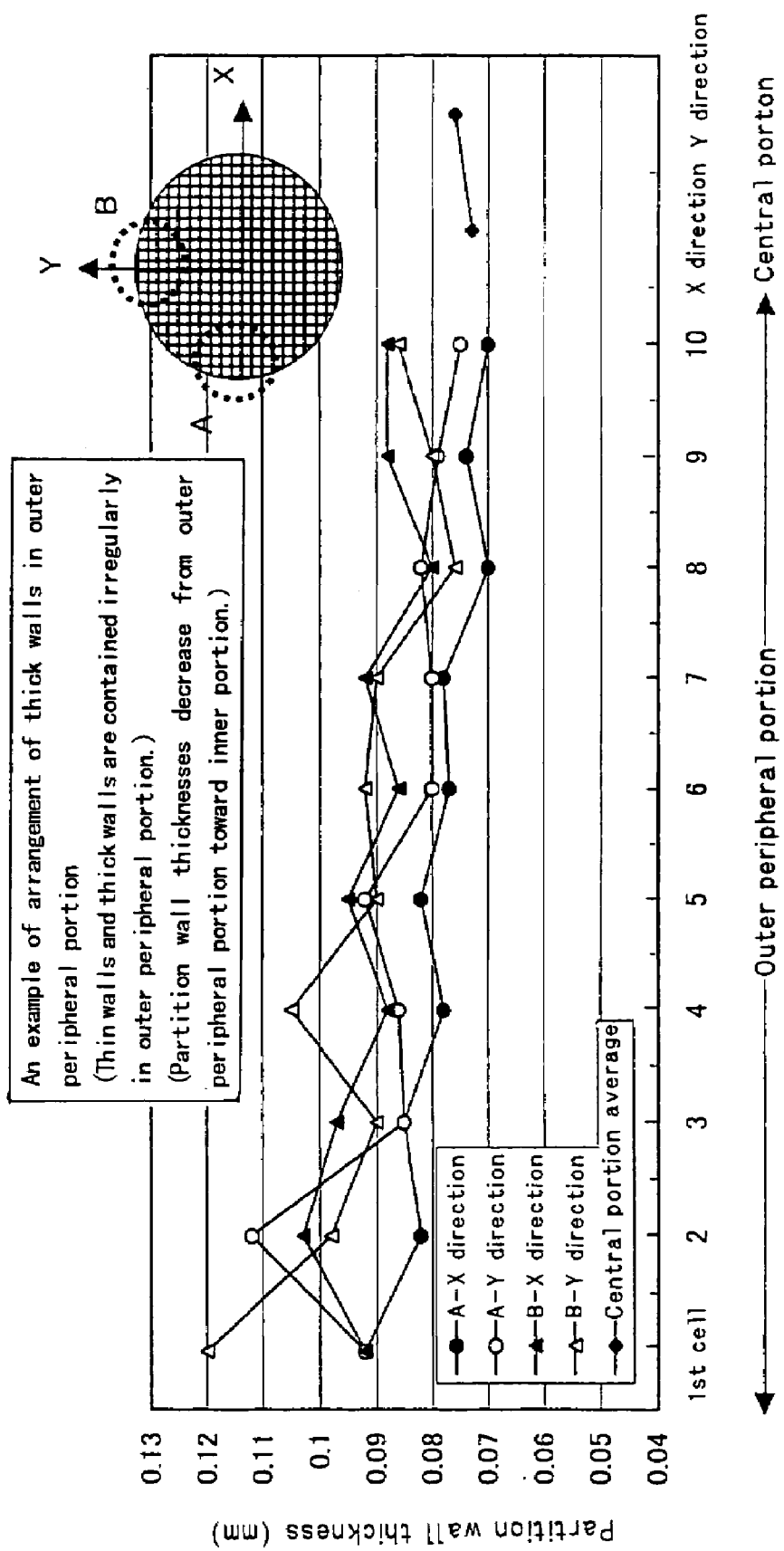
FIG. 18 is a graph showing other example in which the thicknesses of partition walls are changed stepwise in the honeycomb structure of the present invention.

Also, the partition walls 2 having a thickness larger than the average partition wall thickness and the partition walls 1 having a thickness smaller than the average partition wall thickness may be provided regularly or irregularly. However, providing irregularly is preferred in that it can relax the concentration of thermal stress and can give an enhanced thermal shock resistance. As one specific example, there can be mentioned a honeycomb structure in which partition wall thicknesses are changed as in the graph of FIG. 18.

Meanwhile, for increase of the strength of whole structure, it is preferred to provide partition walls 2 having a thickness larger than the average partition wall thickness, in linear positions, and it is more preferred to scatter the partition walls 2 having a thickness larger than the average partition wall thickness, in the whole portion of honeycomb structure. When the partition walls near the outer peripheral portion of honeycomb structure are made thin, the strength of the whole structure decreases and therefore is preferred to be reinforced. As the means for reinforcement, there can be mentioned, for example, plugging, with the same material as used for the honeycomb structure, of the insides of those through-holes 3 formed by a partition wall group including partition walls adjacent to the outer wall of honeycomb structure, according to extrusion molding using a die of adjusted shape; or impregnation of a partition wall group including partition walls adjacent to the outer wall of honeycomb structure, with the same material as used for the honeycomb structure or a different material to achieve a lower porosity and a higher density.

As the above different material, there are preferably used, when the honeycomb structure is made of, for example, a cordierite type ceramic material, mullite, alumina, silica, magnesia, etc., all of which are a ceramic material and have relatively similar thermal expansion coefficients.

Figure 17:
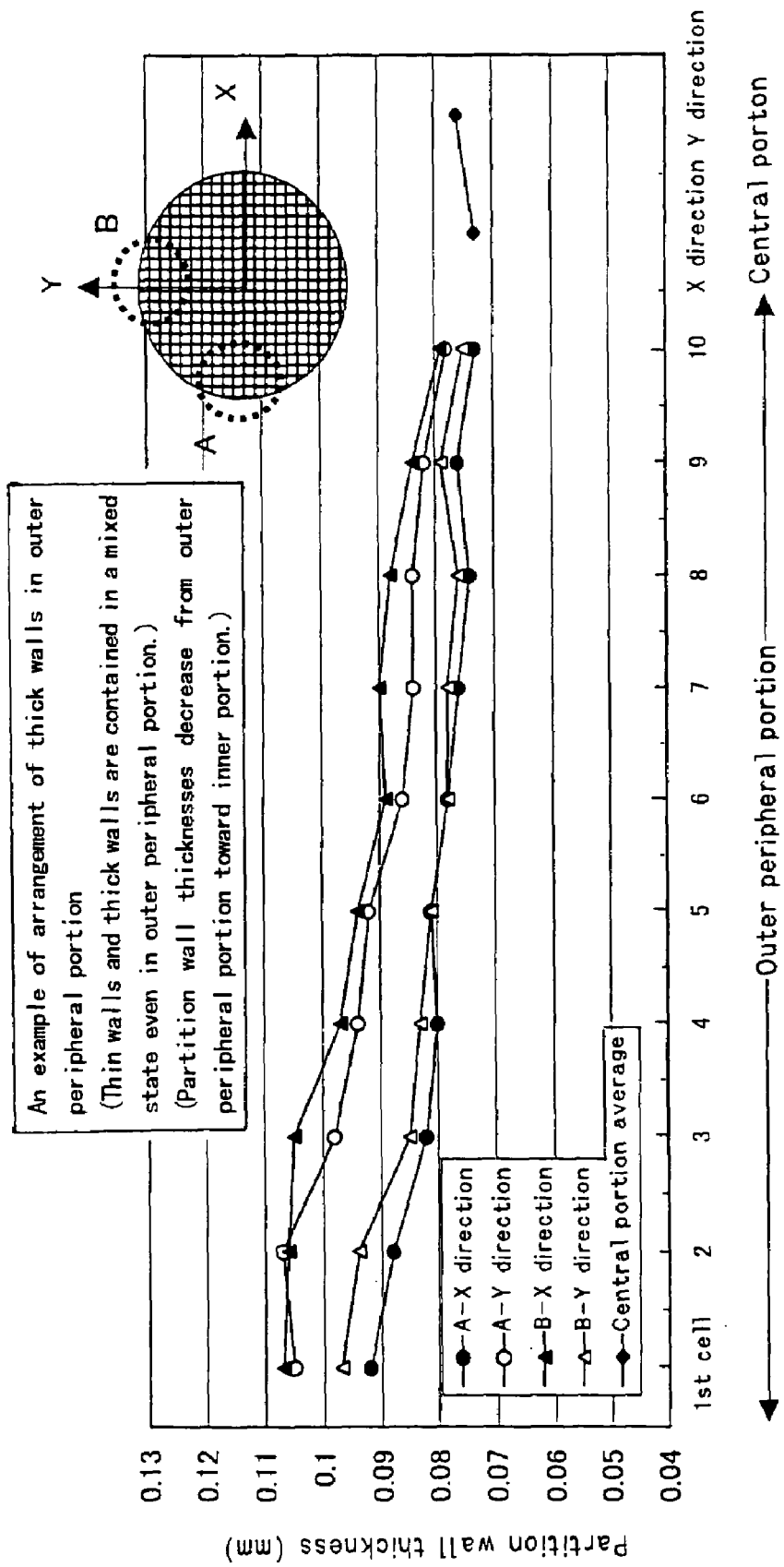
FIG. 17 is a graph showing one example in which the thicknesses of partition walls are changed stepwise in the honeycomb structure of the present invention.

Also, the partition walls 1 having a thickness smaller than the average partition wall thickness may be constituted by at least two kinds of partition walls of different thicknesses. Similarly, the partition walls 2 having a thickness larger than the average partition wall thickness may be constituted by at least two kinds of partition walls of different thicknesses. In this case, when, for example, the erosion of partition walls in honeycomb structure 10 occurs mainly in the partition walls of honeycomb structure central portion, but the exhaust gas-injected area 4 of honeycomb structure end face is the entire area of end face and erosion becomes gradually weaker toward the periphery of end face, the plurality of honeycomb walls 1 and 2 are provided so as to become thinner stepwise or continuously from the center of honeycomb structure 10 towards its outer periphery, whereby the required erosion resistance can be exhibited effectively. As one specific example, there can be mentioned a honeycomb structure in which partition wall thicknesses are changed as in the graph of FIG. 17.

In the above case, also when the proportion of the partition walls 1 having a thickness smaller than the average partition wall thickness is made larger stepwise or continuously from the center of honeycomb structure 10 towards its outer periphery, the erosion resistance can be enhanced effectively.

Next, specific description is made on the positions at which the partition walls 1 having a thickness smaller than the average partition wall thickness and the partition walls 2 having a thickness larger than the average partition wall thickness are provided, with referring to drawings.

FIGS. 5 to 16 are each a sectional view schematically showing a state in which, in the first honeycomb structure, the partition walls having a thickness smaller than the average partition wall thickness and the partition walls having a thickness larger than the average partition wall thickness are arranged.

As shown in FIGS. 5 to 9, as one embodiment of the first honeycomb structure, there can be mentioned a honeycomb structure in which a plurality of through-holes 4 extending in the axial direction are formed by a plurality of partition walls 1 and 2, wherein the plurality of partition walls 1 and 2 are constituted by a plurality of partition walls having different thicknesses, and a partition wall group 11 consisting of those partition walls 2 having a thickness larger than the average thickness of all partition walls and those partition walls 1 having a thickness smaller than the average partition wall thickness is provided in a particular portion of honeycomb structure and a partition wall group 12 consisting only of partition walls 1 having a thickness smaller than the average partition wall thickness is provided in other portion.

In this honeycomb structure 10, a partition wall group consisting of partition walls 2 having a thickness larger than the average partition wall and partition walls 1 having a thickness smaller than the average partition wall thickness is provided so as to correspond to the exhaust-gas-injected area of honeycomb structure end face, whereby the erosion resistance of the honeycomb structure can be enhanced effectively; further, a partition wall group 12 consisting only of partition walls 1 having a thickness smaller than the average partition wall thickness is provided in other portion of honeycomb structure not corresponding to the exhaust gas-injected area of honeycomb structure end face, whereby the honeycomb structure can maintain a good warm-up property and exhibit a high purifiability for exhaust gas. Also, the honeycomb structure has an advantage of increased strength as compared with when thick partition walls are provided only in the outer peripheral portion of honeycomb structure. Moreover, in this honeycomb structure, since partition walls 2 having a thickness larger than the average partition wall and partition walls 1 having a thickness smaller than the average partition wall thickness are provided in a mixed state, a good warm-up property, in particular, can be exhibited. In addition, since in the portion of honeycomb structure wherein partition walls 2 having a thickness larger than the average partition wall thickness are provided, thick partition walls of high heat capacity and thin partition walls of low heat capacity exist in a mixed state, there is a mild temperature gradient between the above portion and a honeycomb structure portion wherein a partition wall group 12 consisting only of partition walls 1 having a thickness smaller than the average partition wall thickness is provided, and the thermal stress at the boundary of the two portions can be reduced.

Figure 5:
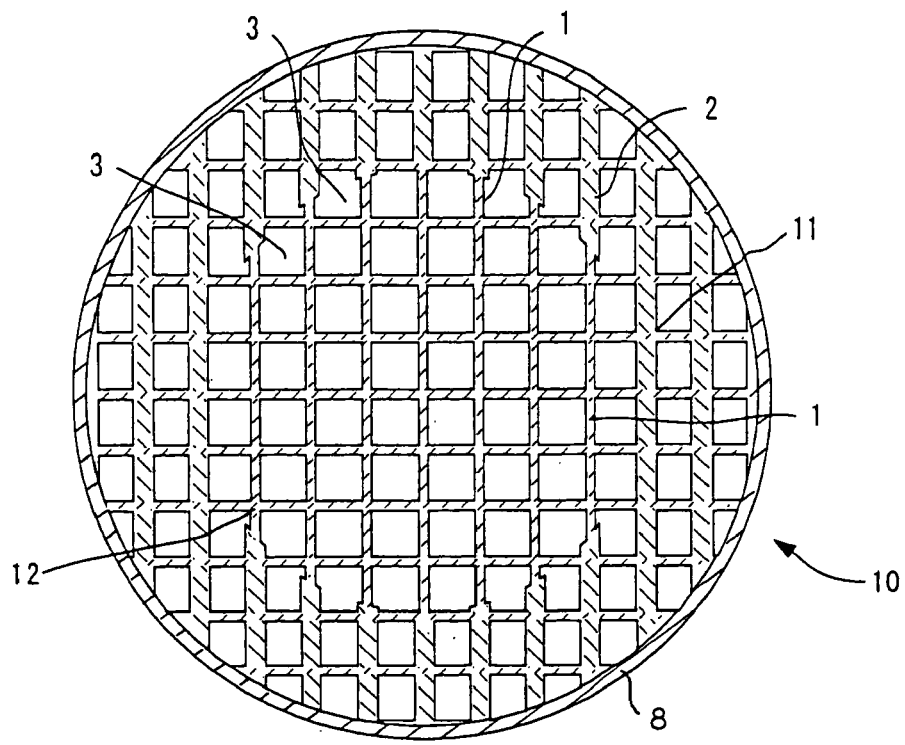
FIG. 5 is a sectional view showing one example of the arrangement pattern of partition walls having a thickness smaller than the average thickness of all partition walls and partition walls having a thickness larger than the average partition wall thickness, in the first honeycomb structure of the present invention.
Figure 6:
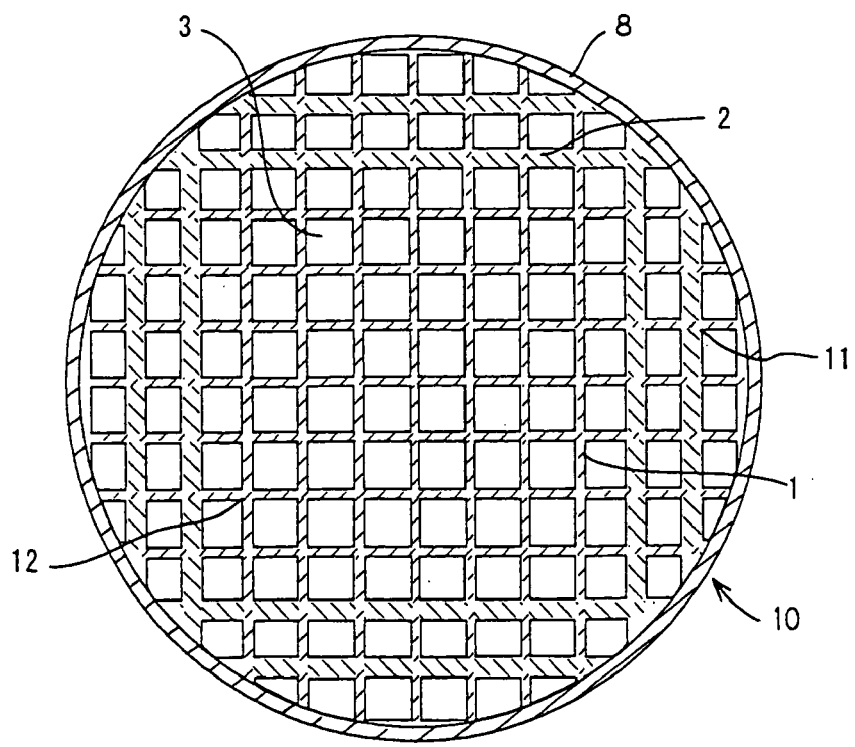
FIG. 6 is a sectional view showing other example of the arrangement pattern of partition walls having a thickness smaller than the average thickness of all partition walls and partition walls having a thickness larger than the average partition wall thickness, in the first honeycomb structure of the present invention.
Figure 7:
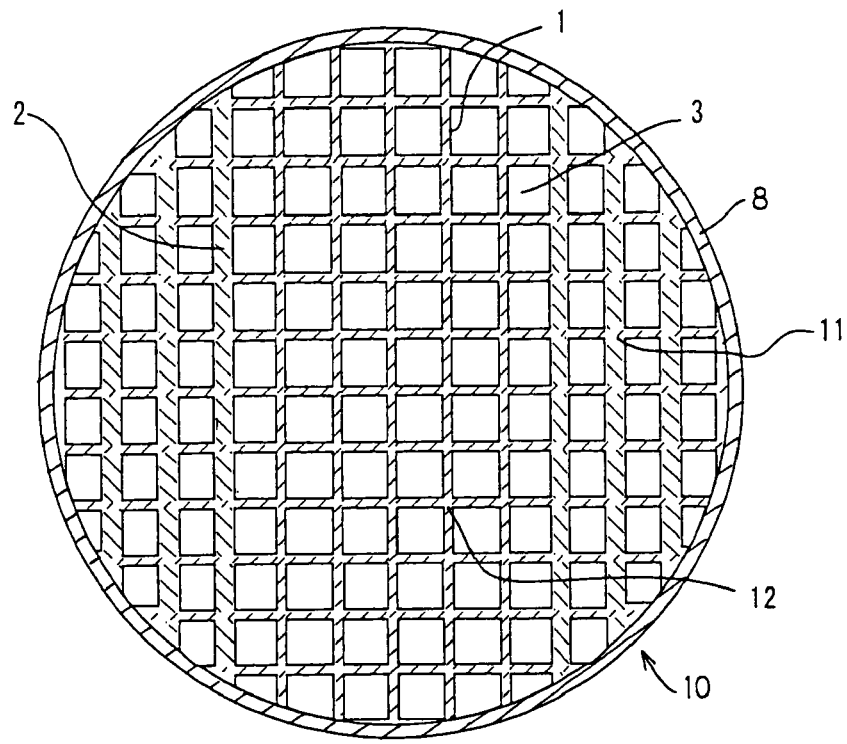
FIG. 7 is a sectional view showing still other example of the arrangement pattern of partition walls having a thickness smaller than the average thickness of all partition walls and partition walls having a thickness larger than the average partition wall thickness, in the first honeycomb structure of the present invention.
Figure 8:
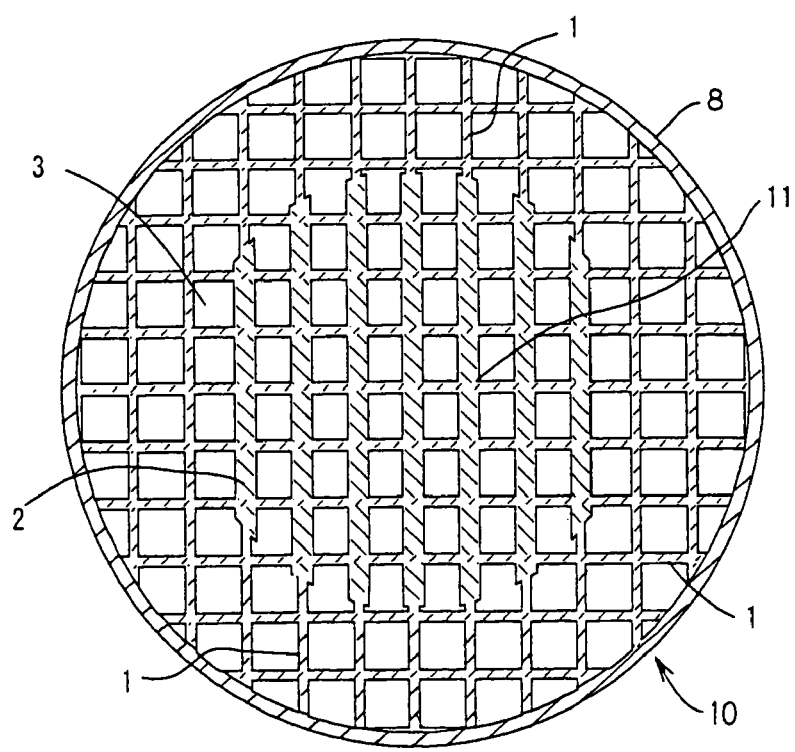
FIG. 8 is a sectional view showing still other example of the arrangement pattern of partition walls having a thickness smaller than the average thickness of all partition walls and partition walls having a thickness larger than the average partition wall thickness, in the first honeycomb structure of the present invention.
Figure 9:
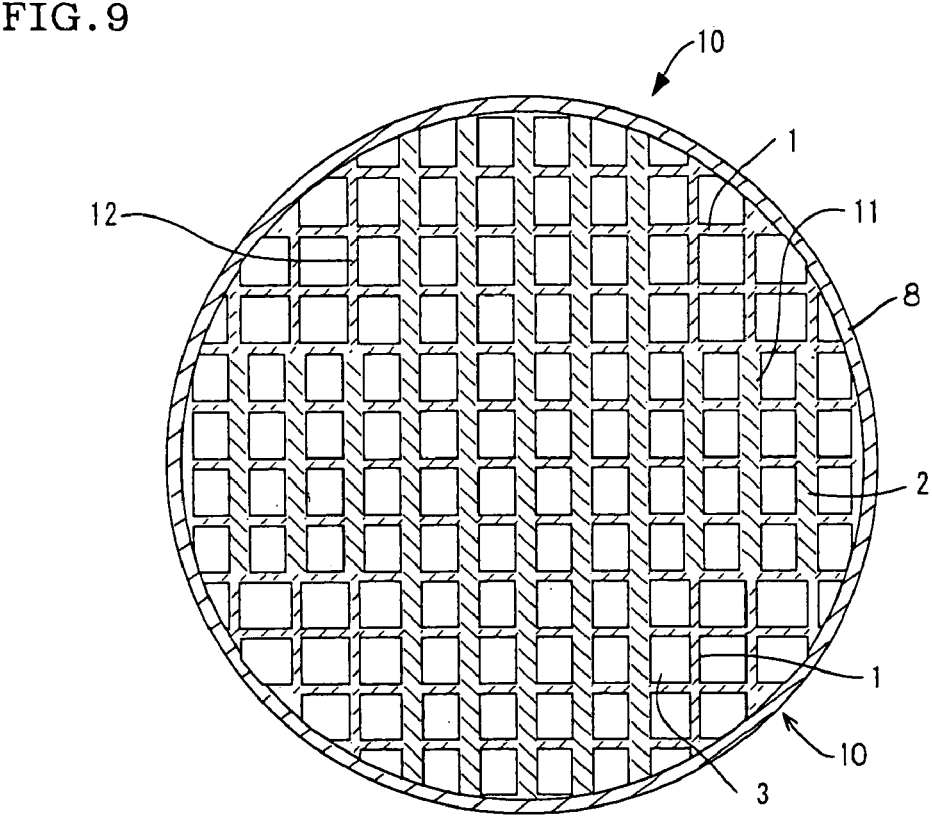
FIG. 9 is a sectional view showing still other example of the arrangement pattern of partition walls having a thickness smaller than the average thickness of all partition walls and partition walls having a thickness larger than the average partition wall thickness, in the first honeycomb structure of the present invention.

As such a honeycomb structure, there can be mentioned, for example, a honeycomb structure such as shown in FIGS. 5 to 7, wherein a partition wall group 11 consisting of partition walls 2 having a thickness larger than the average partition wall thickness and partition walls 1 having a thickness smaller than the average partition wall thickness is provided so as to include at least part of the of the portion of honeycomb structure near the outer peripheral portion, and a partition wall group 12 consisting only of partition walls 1 having a thickness smaller than the average partition wall thickness is provided so as to include a honeycomb structure central portion located inside the portion of honeycomb structure near the outer peripheral portion; and a honeycomb structure such as shown in FIGS. 8 and 9, wherein a partition wall group 12 consisting only of partition walls 1 having a thickness smaller than the average partition wall thickness is provided so as to include at least part of the portion of honeycomb structure near the outer peripheral portion, and a partition wall group 11 consisting of partition walls 2 having a thickness larger than the average partition wall thickness and partition walls 1 having a thickness smaller than the average partition wall thickness is provided so as to include a honeycomb structure central portion located inside the portion of honeycomb structure near the outer peripheral portion.

Figure 2:
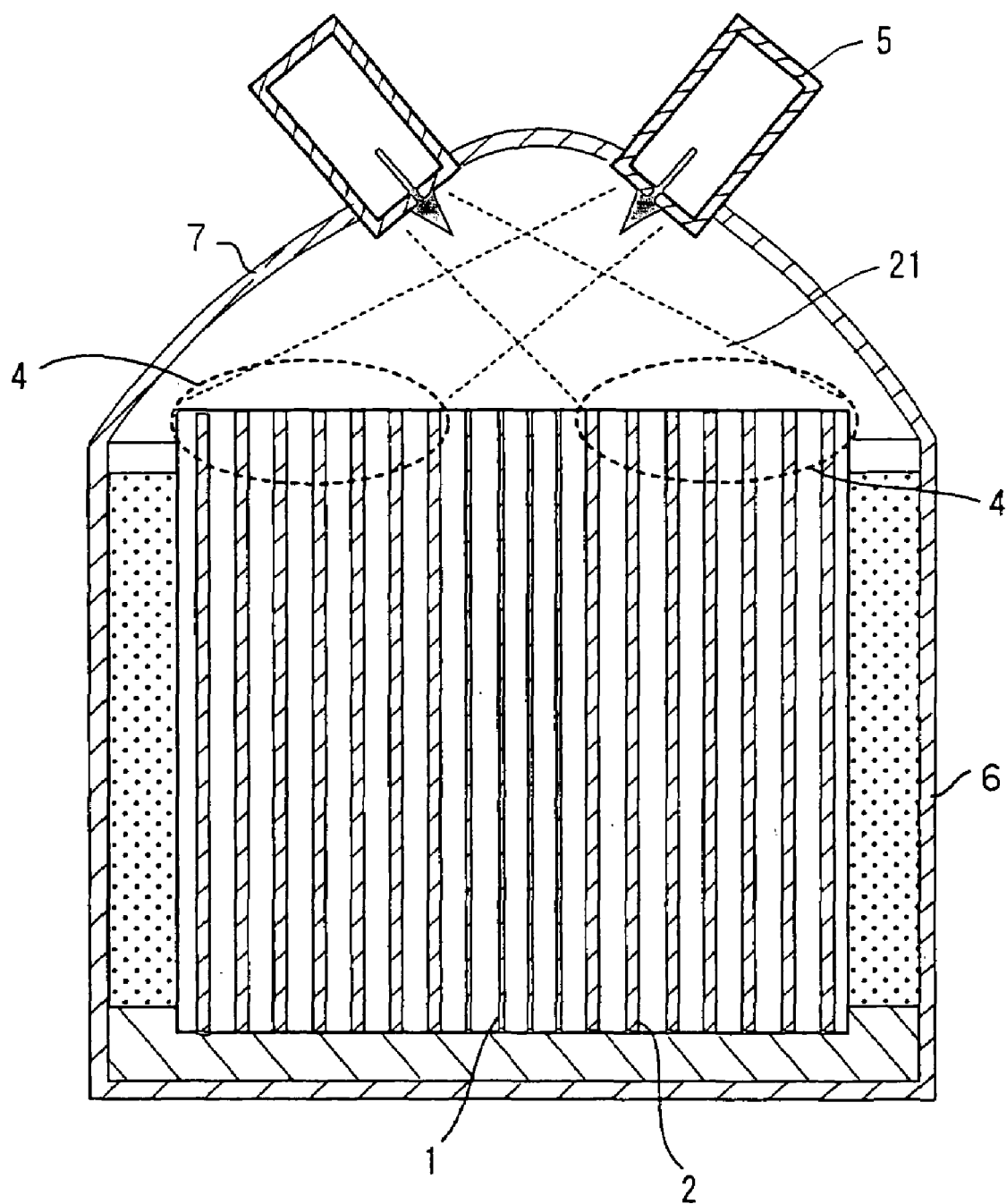
FIG. 2 is a sectional view schematically showing other embodiment of the converter system of the present invention.
Figure 3A:
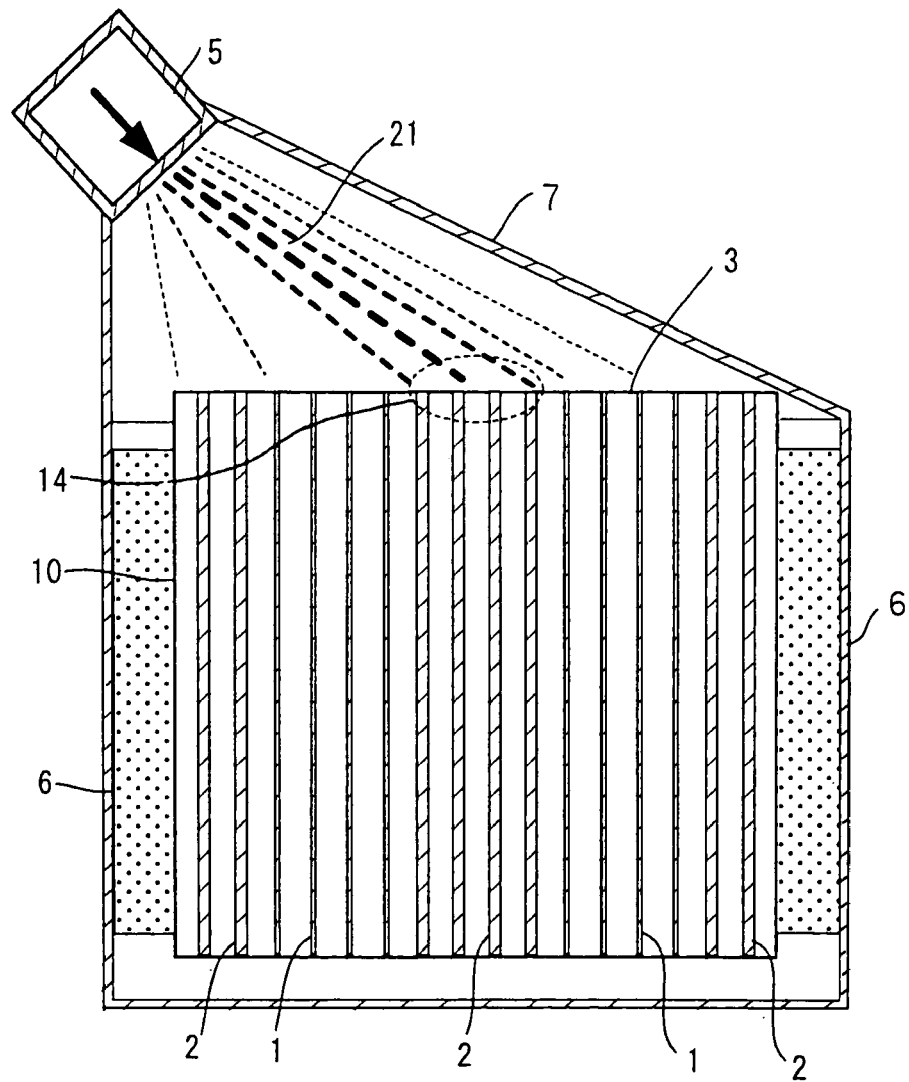
FIG. 3(*a*) is a sectional view schematically showing still other embodiment of the converter system of the present invention.
Figure 3B:
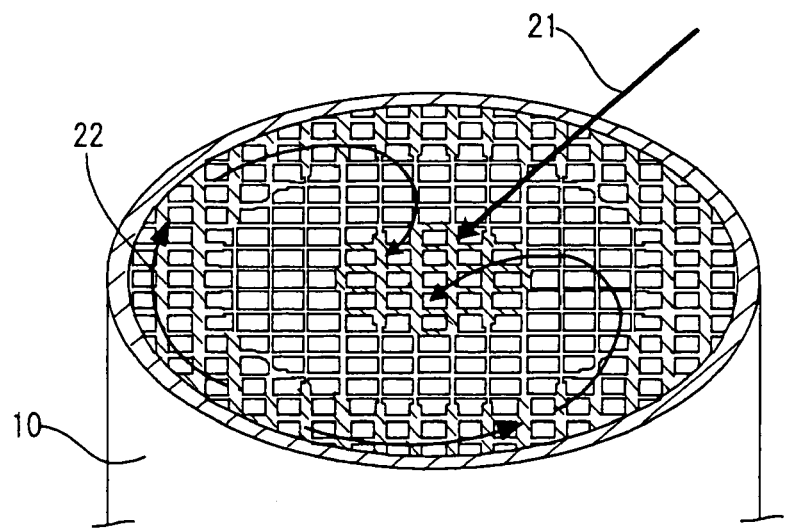
Figure 4:
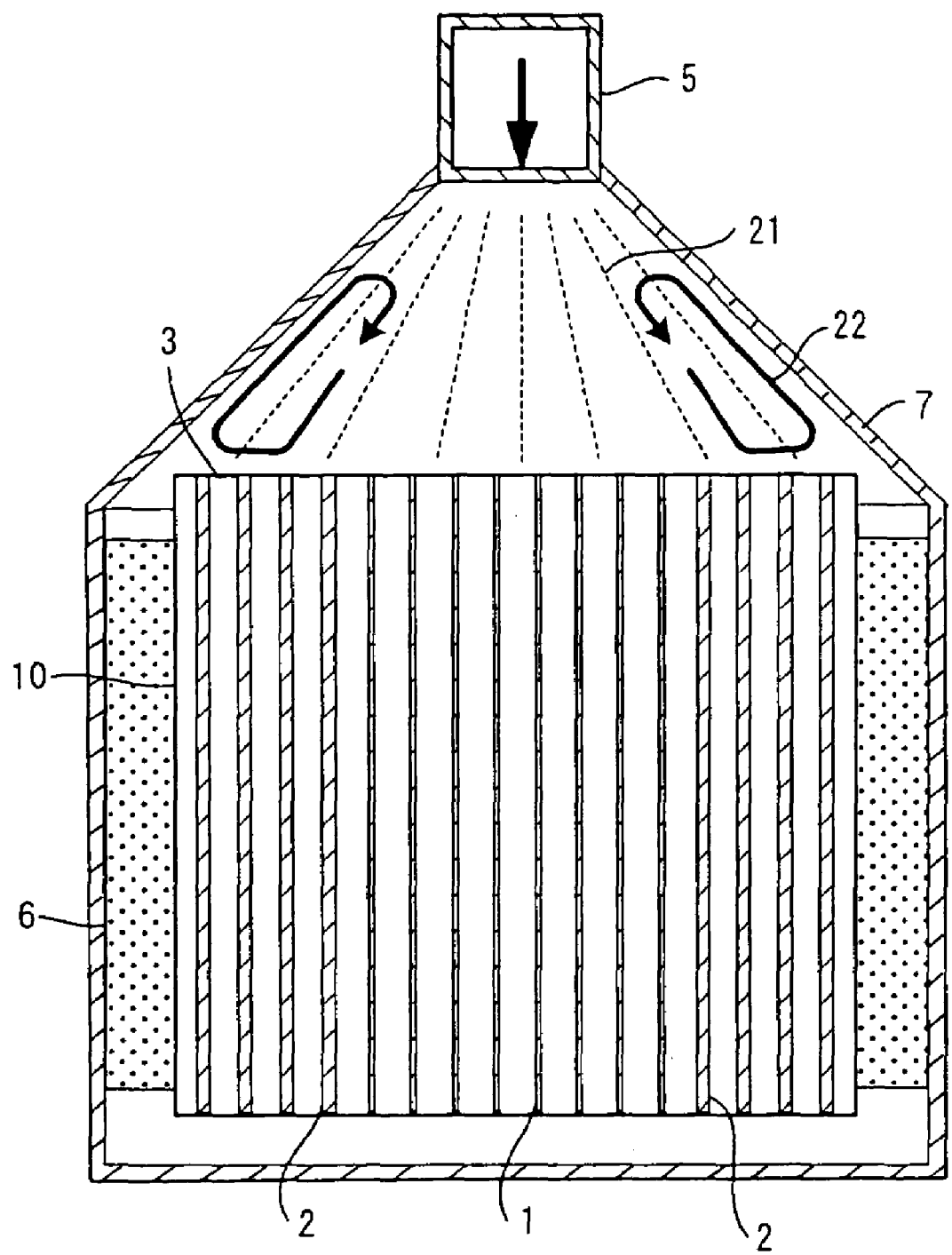
FIG. 4 is a sectional view schematically showing still other embodiment of the converter system of the present invention.

In the former honeycomb structure, the erosion resistance can be enhanced effectively when the exhaust gas-injected area 4 of honeycomb structure end face is concentrated at the area of end face near its peripheral area as in a converter system shown in FIG. 2, or when erosion takes place concentratedly at the area of end face area hear its peripheral area by the local circulating flow 22 of exhaust gas as in a converter system shown in FIG. 3 or 4. Meanwhile in the latter honeycomb structure, the erosion resistance can be enhanced effectively when the exhaust gas-injected area of honeycomb structure end face is concentrated at the central area of honeycomb structure end face as in a converter system shown in FIG. 1 or FIG. 3.

As the former honeycomb structure, there can be mentioned (1) a honeycomb structure such as shown in FIG. 5, wherein a partition wall group 11 consisting of partition walls 2 having a thickness larger than the average partition wall thickness and partition walls 1 having a thickness smaller than the average partition wall thickness is provided in the portion of honeycomb structure near the outer peripheral portion, and a partition wall group 12 consisting only of partition walls 1 having a thickness smaller than the average partition wall thickness is provided in a honeycomb structure central portion located inside the portion of honeycomb structure near the outer peripheral portion; (2) a honeycomb structure such as shown in FIG. 6, wherein a partition wall group 12 consisting only of partition walls 1 having a thickness smaller than the average partition wall thickness is provided in a honeycomb structure portion including a central portion located inside the portion near the outer peripheral portion and having a tetragonal section surrounded by four sides connecting to the outer peripheral wall of honeycomb structure, and a partition wall group 11 consisting of partition walls 2 having a thickness larger than the average partition wall thickness and partition walls 1 having a thickness smaller than the average partition wall thickness is provided in other portion of honeycomb structure which includes part of the portion near the outer peripheral portion; and (3) a honeycomb structure such as shown in FIG. 7, wherein a partition wall group 12 consisting only of partition walls 1 having a thickness smaller than the average partition wall thickness is provided in a honeycomb structure portion which includes a central portion surrounded by two parallel straight lines connecting to the outer peripheral wall and two curved lines formed by the inner surface sections of outer peripheral wall connecting the two straight lines, and a partition wall group 11 consisting of partition walls 2 having a thickness larger than the average partition wall thickness and partition walls 1 having a thickness smaller than the average partition wall thickness is provided in other portion of honeycomb structure which includes part of the portion near the outer peripheral portion.

In the honeycomb structure 10 shown in FIG. 5, since the partition wall group of the portion near the outer peripheral portion contains even partition walls 1 having a thickness smaller than the average partition wall thickness, an increase in heat capacity and pressure loss in the above portion can be suppressed, making possible an improvement in warm-up property, etc. and further an excessive increase in rigidity can be suppressed, making it possible to prevent a reduction in thermal shock resistance.

In the honeycomb structure 10 shown in FIG. 6, since a partition wall group 12 consisting only of partition walls 1 having a thickness smaller than the average partition wall thickness is provided even in part of the portion near the outer peripheral portion, the effects described in the honeycomb structure shown in FIG. 5, such as reduction in heat capacity and pressure loss, increase in thermal shock resistance, and the like can be enhanced further.

In the honeycomb structure shown in FIG. 7, since a partition wall group 12 consisting only of partition walls 1 having a thickness smaller than the average partition wall thickness is provided in a broader range than in the honeycomb structure shown in FIG. 6, the effects described in the honeycomb structure shown in FIG. 5, such as reduction in heat capacity and pressure loss, increase in thermal shock resistance, and the like can be enhanced strikingly.

Incidentally, when a partition wall group is made thick in the portion of honeycomb structure near the outer peripheral portion, thick walls are provided in a honeycomb structure portion ranging from the outer periphery to preferably at least the 10th cells, more preferably to at least the 20th cells.

In a honeycomb structure provided right below an exhaust manifold, an exhaust gas hits the exhaust gas-injected end face of honeycomb structure locally, and the size of the end face area at which the exhaust gas hits strongly, is close to the diameter of the exhaust manifold. The diameter of exhaust manifold is about 10 to 30 mm in many cases and the outer diameter of honeycomb structure is generally about 100 mm. Therefore, it is preferred that thick walls are provided in a honeycomb structure portion ranging from the outer periphery to 10 to 60% of honeycomb structure diameter.

"Central area of honeycomb structure end face" means an area of end face located inside the area near the outer peripheral area, where the injection of exhaust gas is generally stronger or weaker than in the area near the outer peripheral area. In, for example, FIG. 4, when the diameter of the exhaust gas inlet pipe is about 50 mm and the diameter of the honeycomb structure is about 100 mm, the central area of honeycomb structure end face is an area shown by, for example, a circle of about 50 to 80 mm in diameter having its center at the center of honeycomb structure end face.

Next, as the latter honeycomb structure, there can be mentioned (1) a honeycomb structure shown in FIG. 8, wherein a partition wall group 12 consisting only of partition walls 1 having a thickness smaller than the average partition wall thickness is provided in the portion near the outer peripheral portion, and a partition wall group 11 consisting of partition walls 2 having a thickness larger than the average partition wall and partition walls 1 having a thickness smaller than the average partition wall thickness is provided in the central portion located inside the portion near the outer peripheral portion; and (2) a honeycomb structure shown in FIG. 9, wherein a partition wall group 11 consisting of partition walls 2 having a thickness larger than the average partition wall and partition walls 1 having a thickness smaller than the average partition wall thickness is provided in a portion of + shape including at least part of the central portion and part of the outer peripheral portion, and a partition wall group 12 consisting only of partition walls 1 having a thickness smaller than the average partition wall thickness is provided in other portion including part of the portion near the outer peripheral portion.

In the honeycomb structure shown in FIG. 8, since the partition wall group in the central portion contains even thin partition walls, an increase in heat capacity and pressure loss in the above portion can be suppressed, making possible an increase in warm-up property, etc. and further an excessive increase in rigidity can be suppressed, making it possible to prevent a reduction in thermal shock resistance.

In the honeycomb structure shown in FIG. 9, since partition walls 2 having a thickness larger than the average partition wall thickness exist in part of the honeycomb structure portion near the outer peripheral portion, the mechanical strength of whole honeycomb structure can be increased, and the shape retainability during molding and the canning resistance can be enhanced as compared with the case of the honeycomb structure shown in FIG. 8. Needless to say, since even partition walls 1 having a thickness larger than the average partition wall thickness exist in, for example, the central portion where partition walls 2 having a thickness larger than the average partition wall thickness exist, an increase in heat capacity and pressure loss can be suppressed in the central portion, etc., making possible an improvement in warm-up property, etc. and further an excessive increase in rigidity can be suppressed, making it possible to prevent a reduction in thermal shock resistance.

Incidentally, in a converter system shown in FIG. 3(*a*) wherein an exhaust gas inlet pipe 5 is provided obliquely above relative to the exhaust gas-injected end face of honeycomb structure, the foreign matter in an exhaust gas 21 which has arrived at the end face of honeycomb structure 10, collides with the inner surface of a cone section 7 and is diverged, slides on the area of end face near the periphery of end face in the circumferential direction of end face, is carried by the flow of exhaust gas and again passes (slides on) the central area of end face, as shown in FIG. 3(*b*). Therefore, erosion is generated mainly at the area of end face near the periphery of end face and at the central area of end face. Therefore, in this type of converter system, it is preferred that, as shown in FIG. 3(*b*), there is used such a honeycomb structure as a partition wall group 11 consisting of partition walls 2 having a thickness larger than the average partition wall thickness and partition walls 1 having a thickness smaller than the average partition wall thickness is provided in at least part of the portion of honeycomb structure near the outer peripheral portion and in at least part of the central portion of honeycomb structure, and a partition wall group 12 consisting only of partition walls 1 having a thickness smaller than the average partition wall thickness is provided in an intermediate portion located between the above two portions.

Figure 10:
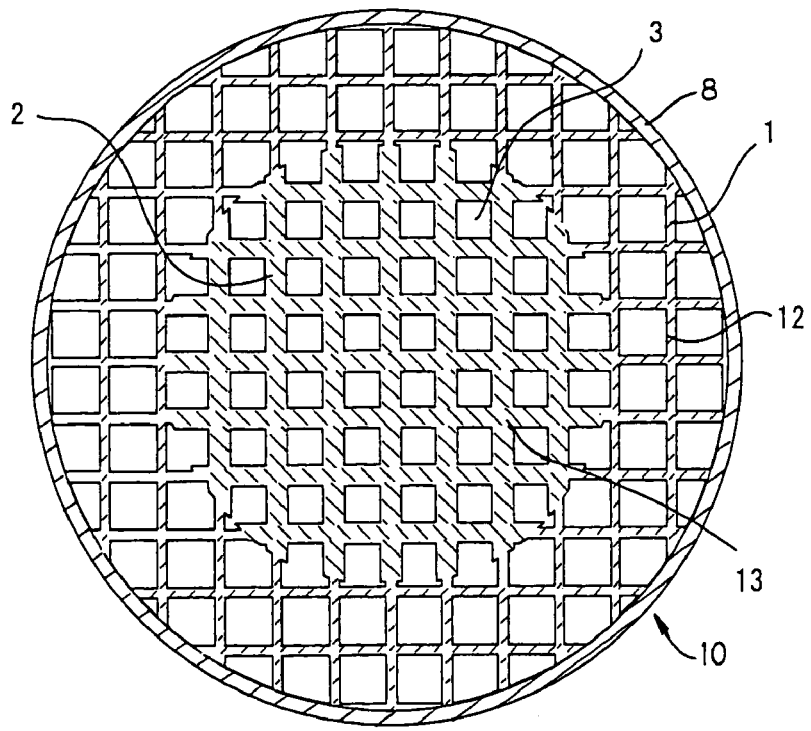
FIG. 10 is a sectional view showing still other example of the arrangement pattern of partition walls having a thickness smaller than the average thickness of all partition walls and partition walls having a thickness larger than the average partition wall thickness, in the first honeycomb structure of the present invention.
Figure 11:
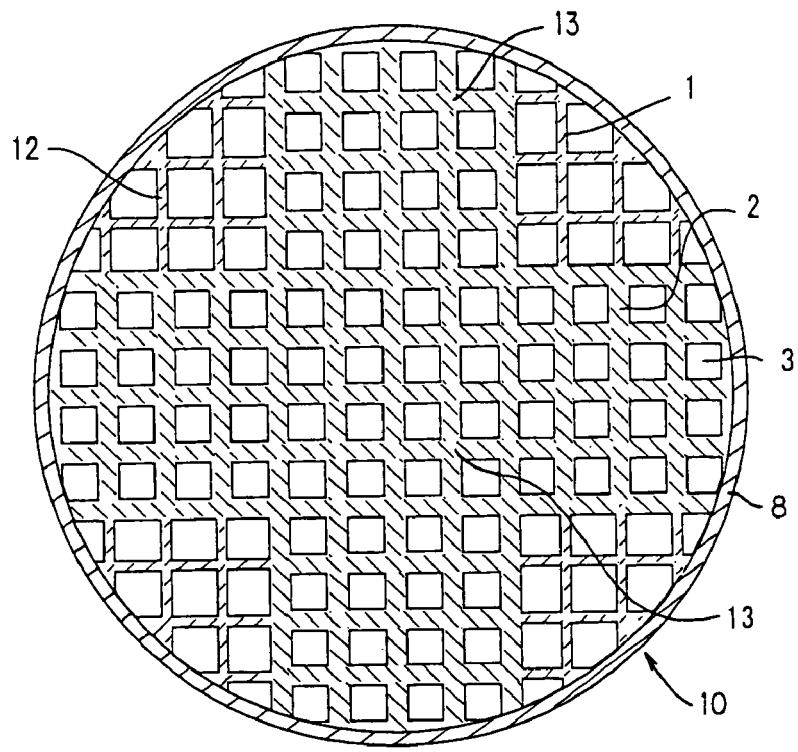
FIG. 11 is a sectional view showing still other example of the arrangement pattern of partition walls having a thickness smaller than the average thickness of all partition walls and partition walls having a thickness larger than the average partition wall thickness, in the first honeycomb structure of the present invention.

Next, description is made on other embodiment of the first honeycomb structure, shown in FIGS. 10 and 11.

As the other embodiment of the first honeycomb structure, there can be mentioned a honeycomb structure 10 of FIGS. 10 and 11, wherein a plurality of through-holes extending in the axial direction are formed by a plurality of partition walls 1 and 2, the plurality of partition walls 1 and 2 are constituted by a plurality of partition walls having different thicknesses, a partition wall group 13 consisting only of partition walls 2 having a thickness larger than the average partition wall thickness is provided in a particular portion of honeycomb structure, and a partition wall group 12 consisting only of partition walls 1 having a thickness smaller than the average partition wall thickness is provided in other portion of honeycomb structure.

In this honeycomb structure 10, since a partition wall group consisting only of partition walls 2 having a thickness larger than the average partition wall thickness is provided so as to correspond to the exhaust gas-injected area of honeycomb structure end face, the erosion resistance can be enhanced effectively; further, since a partition wall group 12 consisting only of partition walls 1 having a thickness smaller than the average partition wall thickness is provided in other honeycomb structure portion not corresponding to the exhaust gas-injected area of honeycomb structure end face, a good warm-up property can be maintained and a high purifiability for exhaust gas can be exhibited. Also the honeycomb structure has an advantage of higher structure strength as compared with when thick walls are employed only at the outer peripheral portion of honeycomb structure.

As such a honeycomb structure, there can be mentioned a honeycomb structure shown in FIGS. 10 and 11, wherein a plurality of partition walls 1 and 2 are constituted by a plurality of partition walls having different thicknesses, a partition wall group 12 consisting only of partition walls 1 having a thickness smaller than the average partition wall thickness is provided so as to include at least part of the portion of honeycomb structure near the outer peripheral portion, and a partition wall group 13 consisting only of partition walls 2 having a thickness larger than the average partition wall thickness is provided so as to include the central portion located inside the portion of honeycomb structure near the outer peripheral portion; and a honeycomb structure shown in FIGS. 10 and 11, wherein a plurality of partition walls 1 and 2 are constituted by a plurality of partition walls having different thicknesses, a partition wall group 13 consisting only of partition walls 2 having a thickness larger than the average partition wall thickness is provided in so as to include at least part of the portion of honeycomb structure near the outer peripheral portion, and a partition wall group 12 consisting only of partition walls 1 having a thickness smaller than the average partition wall thickness is provided so as to include the central portion located inside the portion of honeycomb structure near the outer peripheral portion.

In the case of the former honeycomb structure, the corrosion resistance can be enhanced effectively when the exhaust gas-injected area of honeycomb structure end face is concentrated at the central area of end face as in the converter system of FIG. 1 or FIG. 3.

Particularly in this honeycomb structure, since only partition walls 2 having a thickness larger than the average partition wall thickness are used in the central portion corresponding to the exhaust gas-injected are of honeycomb structure end face, the erosion resistance is large and, further, as compared with the case of a honeycomb structure wherein partition walls 2 having a thickness larger than the average partition wall thickness and partition walls 1 having a thickness smaller than the average partition wall thickness are provided uniformly in the whole structure portion, the heat capacity can be increased at the central portion which tends to become high temperatures during the use of structure; therefore, an excessive temperature increase at central portion can be prevented and an increase in thermal stress due to temperature difference between different structure portions can be prevented.

Moreover, by controlling the ratio of partition wall thickness between partition walls 2 having a thickness larger than the average partition wall thickness and partition walls 1 having a thickness smaller than the average partition wall thickness, in a range described later, it is possible to appropriately reduce the fluctuation in extrusion speed, generated in the central portion of honeycomb structure and the portion near the outer peripheral portion during extrusion molding owing to the non-uniformity of extrusion pressure or extruding material and thereby enhancing the moldability during extrusion molding.

Meanwhile, in the case of the latter honeycomb structure, the erosion resistance can be enhanced effectively when the exhaust gas-injected area of honeycomb structure end face is concentrated at the area of end face near the peripheral area as in the converter system of FIG. 2, or when erosion takes place concentratedly at the area of end face near the peripheral area owing to the local circulating flow 22 of exhaust gas as in the converter system of FIG. 3 or FIG. 4.

As the former honeycomb structure 10, there can be mentioned (1) a honeycomb structure such as shown in FIG. 10, wherein a partition wall group 12 consisting only of partition walls 1 having a thickness smaller than the average partition wall thickness is provided in the portion of honeycomb structure near the outer peripheral portion, and a partition wall group 13 consisting only of partition wall 2 having a thickness larger than the average partition wall thickness is provided in the central portion of honeycomb structure located inside the portion near the outer peripheral portion; and (2) a honeycomb structure such as shown in FIG. 11, wherein a partition wall group 13 consisting only of partition wall 2 having a thickness larger than the average partition wall thickness is provided in at least part of the central portion and in a portion including part of the outer peripheral portion, having a section of + shape, and a partition wall group 12 consisting only of partition walls 1 having a thickness smaller than the average partition wall thickness is provided in other portion including part of the portion near the outer peripheral portion.

In the honeycomb structure 10 shown in FIG. 10, the erosion resistance can be enhanced effectively when the exhaust gas-injected area of honeycomb structure end face is concentrated at the end face central area of honeycomb structure 10 as in the converter system shown in FIG. 1 or FIG. 3.

In the honeycomb structure 10 shown in FIG. 11, the erosion resistance can be enhanced effectively when the exhaust gas-injected area of honeycomb structure end face is concentrated at the end face central area of honeycomb structure 10 as in the honeycomb structure 10 shown in FIG. 10. In addition, since partition walls 2 having a thickness larger than the average partition wall thickness exist in part of the portion of honeycomb structure 10 near the outer peripheral portion, the mechanical strength of whole honeycomb structure can be increased and the shape retainability during molding and the canning resistance can be enhanced, as compared with the case of the honeycomb structure 10 shown in FIG. 10.

Figure 12:
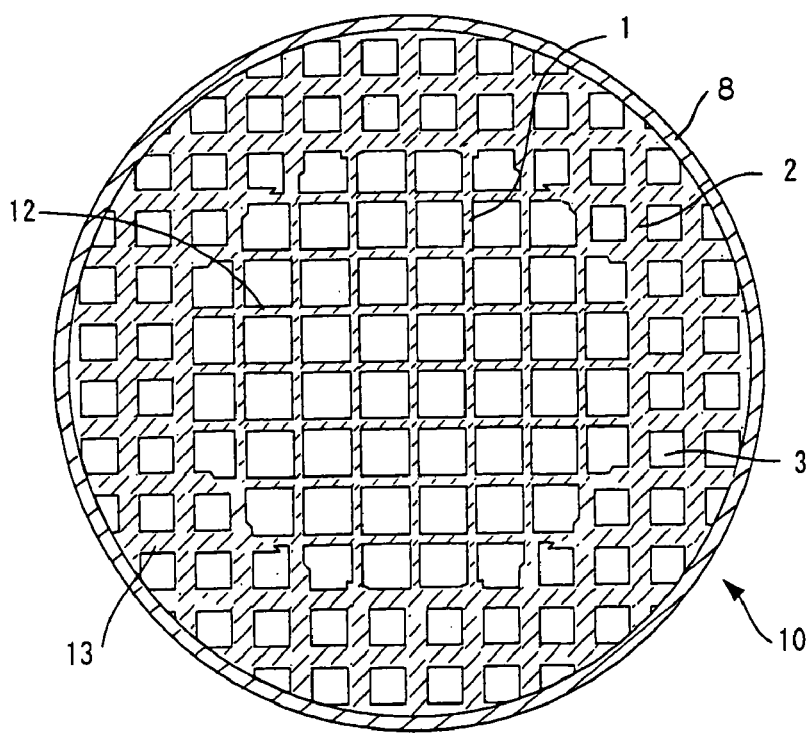
FIG. 12 is a sectional view showing still other example of the arrangement pattern of partition walls having a thickness smaller than the average thickness of all partition walls and partition walls having a thickness larger than the average partition wall thickness, in the first honeycomb structure of the present invention.
Figure 13:
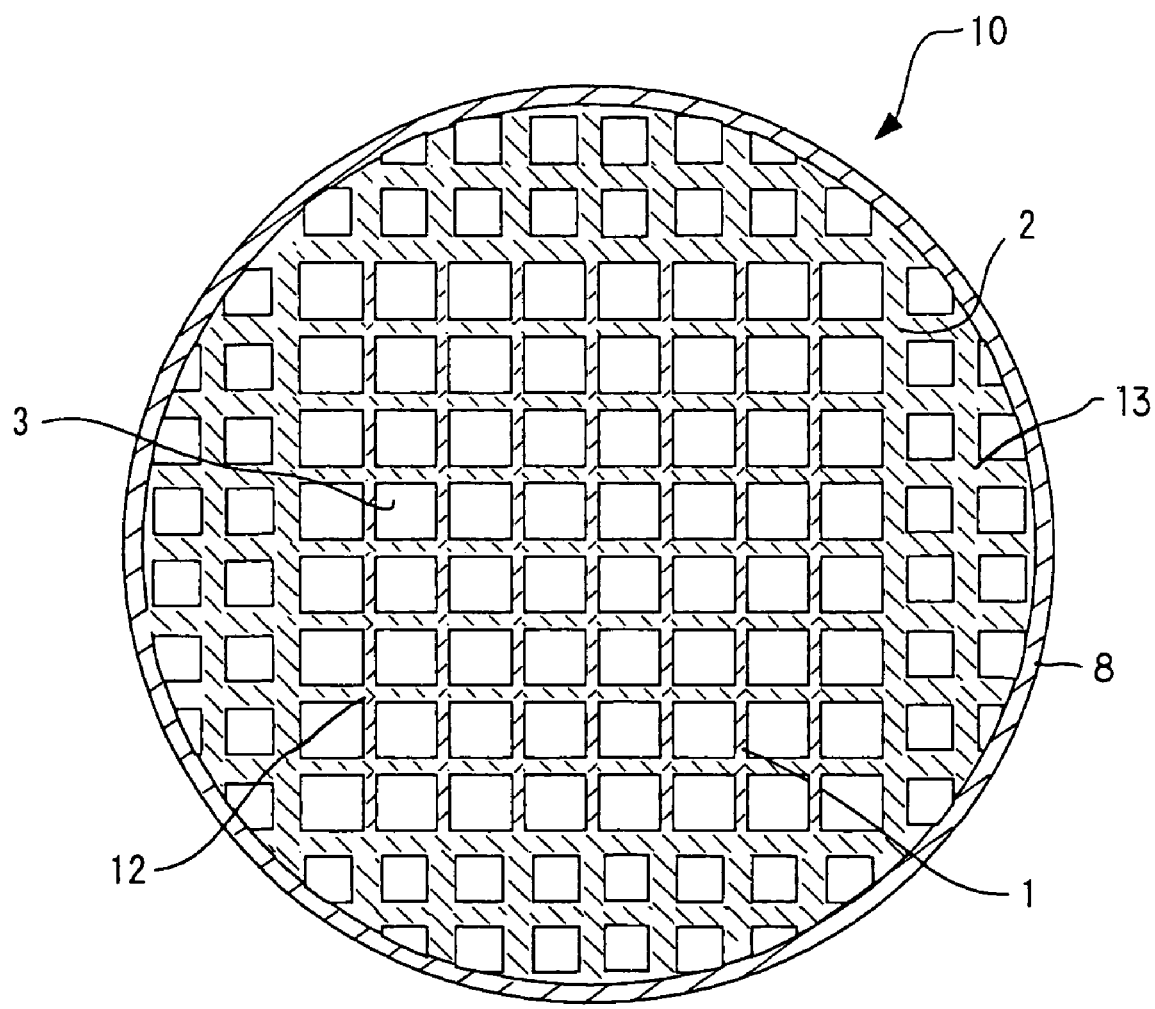
FIG. 13 is a sectional view showing still other example of the arrangement pattern of partition walls having a thickness smaller than the average thickness of all partition walls and partition walls having a thickness larger than the average partition wall thickness, in the first honeycomb structure of the present invention.

As the latter honeycomb structure 10, there can be mentioned (1) a honeycomb structure such as shown in FIG. 12, wherein a partition wall group 13 consisting only of partition walls 2 having a thickness larger than the average partition wall thickness is provided in the portion of honeycomb structure near the outer peripheral portion, and a partition wall group 12 consisting only of partition walls 1 having a thickness smaller than the average partition wall thickness is provided in the central portion located inside the portion near the outer peripheral portion; and (2) a honeycomb structure such as shown in FIG. 13, wherein a partition wall group 12 consisting only of partition walls 1 having a thickness smaller than the average partition wall thickness is provided in a portion including the central portion located inside the portion near the outer peripheral portion and having a tetragonal section surrounded by four sides connecting to the peripheral wall of honeycomb structure, and a partition wall group 13 consisting only of partition walls 2 having a thickness larger than the average partition wall thickness is provided in other portion including part of the portion near the outer peripheral portion.

In the honeycomb structure 10 shown in FIG. 12, the erosion resistance can be enhanced effectively when the exhaust gas-injected area of end face is concentrated in the end face area near the outer peripheral area as in the converter system shown in FIG. 2, or when erosion takes place concentratedly in the end face area near the outer peripheral area owing to the local circulating flow 22 of exhaust gas as in the converter system of FIG. 3 or FIG. 4. In the honeycomb structure 10 shown in FIG. 13, the erosion resistance can be enhanced effectively when the exhaust gas-injected area of end face is concentrated in the end face area near the outer peripheral area or when erosion takes place concentratedly in the end face area near the outer peripheral area owing to the local circulating flow 22 of exhaust gas, as in the honeycomb structure 10 shown in FIG. 12; in addition, since a partition wall group 12 consisting only of partition walls 1 having a thickness smaller than the average wall partition thickness is provided also in part of the portion of honeycomb structure near the outer peripheral portion, effects such as reduction in heat capacity and pressure loss, increase in thermal shock resistance, and the like can be enhanced further.

Incidentally, in the honeycomb structure 10 of this embodiment, when erosion takes place mainly in the partition walls of central portion but on the whole area of honeycomb structure end face and the erosion phenomenon decreases gradually toward the outer peripheral area of end face, the erosion resistance can be enhanced effectively by constituting both of partition walls 1 having a thickness smaller than the average partition wall thickness and partition walls 2 having a thickness larger than the average partition wall thickness, using at least two kinds of partition walls of different thicknesses and making the partition wall thickness smaller stepwise or gradually from the central portion of honeycomb structure 10 toward the outer periphery.

Next, description is made on still other embodiment of the first honeycomb structure.

As the still other embodiment of the first honeycomb structure, there can be mentioned a honeycomb structure wherein a plurality of through-holes extending in the axial direction are formed by a plurality of partition walls and wherein, in the whole honeycomb structure portion in which the plurality of partition walls are provided, partition walls having a thickness larger than the average thickness of all partition walls and partition walls having a thickness smaller than the average partition wall thickness are provided in a mixed state, a partition wall group containing the partition walls having a thickness larger than the average partition wall thickness, in a relatively large amount is provided in a particular portion, and a partition wall group containing the partition walls having a thickness smaller than the average partition wall thickness, in a relatively large amount is provided in other portion.

In this honeycomb structure, since the partition wall group containing the partition walls having a thickness larger than the average partition wall thickness, in a relatively large amount is provided in a particular portion so as to correspond to the exhaust gas-injected area of honeycomb structure end face, the erosion resistance can be enhanced effectively. Further, since the partition wall group containing the partition walls having a thickness smaller than the average partition wall thickness, in a relatively large amount is provided in other portion not corresponding to the exhaust gas-injected area of honeycomb structure end face, a good warm-up property can be maintained and a high purifiability for exhaust gas can be exhibited. Also, there is an advantage that the thermal shock resistance and structure strength can be increased as compared with when only the partition walls at the outer peripheral portion of honeycomb structure are made thick. Also, in this honeycomb structure, since the partition walls having a thickness larger than the average partition wall thickness and the partition walls having a thickness smaller than the average partition wall thickness are provided in a mixed state in the whole portion, a good warm-up property, in particular, can be exhibited and thermal stress concentration can be minimized. Also, in this honeycomb structure, the erosion resistance can be enhanced effectively when erosion takes place mainly in a particular area of end face but slightly in the whole end face area.

Incidentally, in this honeycomb structure as well, the partition walls having a thickness smaller than the average partition wall thickness may be constituted by at least two kinds of partition walls having different thicknesses, and the partition walls having a thickness larger than the average partition wall thickness may be constituted by at least two kinds of partition walls having different thicknesses.

Figure 14:
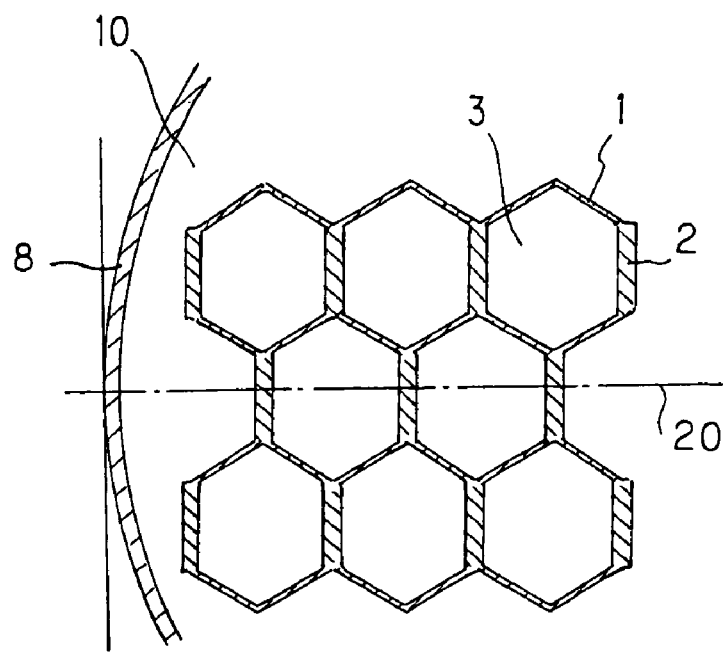
FIG. 14 is a partially enlarged view showing still other example of the arrangement pattern of partition walls having a thickness smaller than the average thickness of all partition walls and partition walls having a thickness larger than the average partition wall thickness, in the first honeycomb structure of the present invention.
Figure 15:
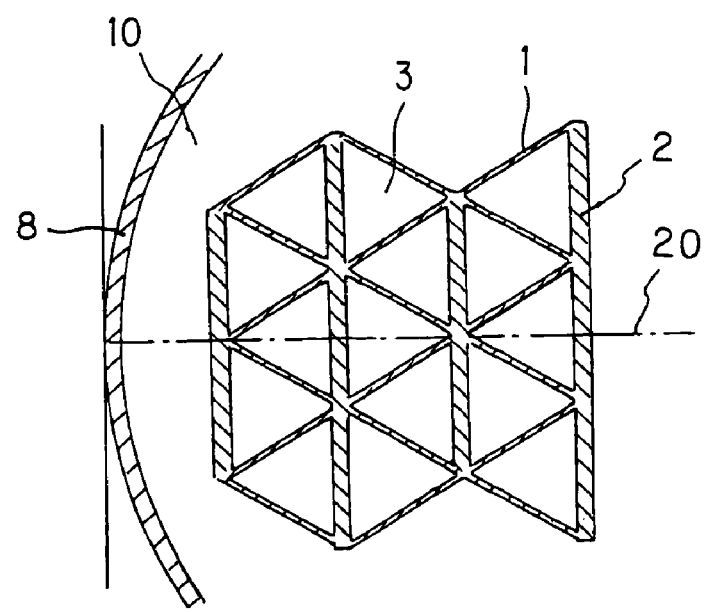
FIG. 15 is a partially enlarged view showing still other example of the arrangement pattern of partition walls having a thickness smaller than the average thickness of all partition walls and partition walls having a thickness larger than the average partition wall thickness, in the first honeycomb structure of the present invention.

Next, the still other embodiment of the first honeycomb structure, shown in FIG. 14 or 15 is described.

In the first honeycomb structure 10 shown in FIG. 14 or 15, when the direction of exhaust gas injection has a particular angle to the direction of through-holes 3 as in the converter systems shown in FIGS. 1 to 3, it is preferred that, of the plurality of partition walls, those partition walls forming through-holes 3 located at the positions which a line 20 normal to the outer peripheral surface of honeycomb structure 10 passes, and having an angle of 70 to 110° to the normal line, are constituted by partition walls 2 having a thickness larger than the average partition wall thickness; it is more preferred that those partition walls having an angle of 80 to 100° are constituted by partition walls 2 having a thickness larger than the average partition wall thickness; and it is particularly preferred that those partition walls having an angle of 85 to 95° are constituted by partition walls 2 having a thickness larger than the average partition wall thickness.

When the injection direction of exhaust gas has an particular angle to the direction of through-holes 3, the partition walls provided at the positions almost normal to the movement direction of foreign matter in exhaust gas undergo the shock by foreign matter easily; therefore, the erosion resistance of such a honeycomb structure can be enhanced effectively by constituting the partition walls which undergo such a shock easily, using partition walls 2 having a thickness larger than the average partition wall thickness.

Incidentally, the reason for the above range of 70 to 110° is that when even partition walls outside this range are constituted using partition walls 2 having a thickness larger than the average partition wall thickness, the drawback of reduction in warm-up property due to increase in heat capacity may be larger than the effect of enhancement in erosion resistance.

Figure 16:
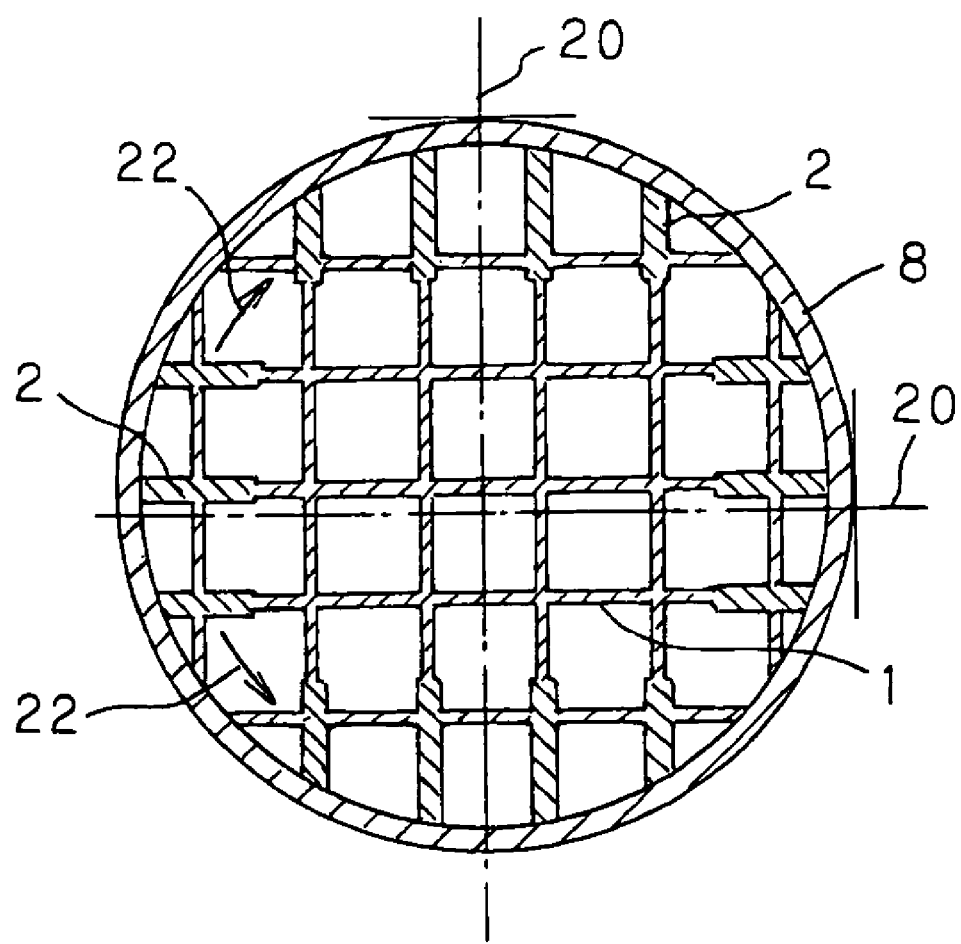
FIG. 16 is a sectional view showing still other example of the arrangement pattern of partition walls having a thickness smaller than the average thickness of all partition walls and partition walls having a thickness larger than the average partition wall thickness, in the first honeycomb structure of the present invention.

Meanwhile, when foreign matter having particle diameters of 1 mm or more is contained in a large amount in an exhaust gas, it is preferred as shown in FIG. 16 that, of the plurality of partition walls, those partition walls forming, in the portion of honeycomb structure 10 near the outer peripheral portion, through-holes 3 located at the positions which a line 20 normal to the outer peripheral surface of honeycomb structure 10 passes, and having an angle of ±20° to the normal line 20, are constituted by partition walls 2 having a thickness larger than the average partition wall thickness; it is more preferred that those partition walls having an angle of ±10° are constituted by partition walls 2 having a thickness larger than the average partition wall thickness; and it is particularly preferred that those partition walls having an angle of ±5° are constituted by partition walls 2 having a thickness larger than the average partition wall thickness.

When an exhaust manifold 5 is made of stainless steel, foreign matter having relatively large particle diameters of 1 mm or more, derived from a weld, etc. is generated. Since this foreign matter slides on the exhaust gas-injected end face of honeycomb structure, changes its movement direction on the inner surface of cone section 7, and slides mainly on the area of end face near the peripheral area in the circumferential direction of end face; therefore, of the partition walls provided near the outer peripheral portion of honeycomb structure, those partition walls located almost normally to the circumferential direction of honeycomb structure undergo a shock easily by the above-mentioned foreign matter of large particle diameters. Therefore, by constituting the partition walls provided in such locations, using partition walls having a thickness larger than the average partition wall thickness, the erosion resistance of honeycomb structure can be enhanced effectively.

When partition walls 2 having a thickness larger than the average partition wall thickness are provided as above, it is preferred to form those partition walls located in the portion of honeycomb structure near the outer peripheral portion and having an angle other than ±20° to a normal line 20 corresponding to through-holes 3, so as to have a smaller thickness and those partition walls located in the central portion, so as to have an even smaller thickness, because the erosion resistance can be enhanced effectively, the heat capacity can be reduced and the warm-up property can be increased.

In the first honeycomb structure, the average partition wall thickness in the plurality of partition walls of different thicknesses is preferably less than 0.10 mm, more preferably less than 0.065 mm.

With an average partition wall thickness of less than 0.10 mm, a warm-up property sufficiently responding to the recent year's requirements can be exhibited and a significantly reduced pressure loss can be achieved.

In the present specification, the term "average partition wall thickness" is a representative value of the partition wall thickness used in calculation of the heat capacity, pressure loss and mechanical strength of a honeycomb structure to be designed, and is roughly a value obtained by dividing the total thickness of at least two kinds of partition walls of different thicknesses, by the kinds of partition wall thicknesses. Incidentally, conventional honeycomb structures are constituted by partition walls having an average thickness of 0.1 mm or more and have been mounted below the floor of vehicle, and no particular consideration has been made to the erosion resistance.

In the first honeycomb structure, in the plurality of partition walls having different thicknesses, the ratio ($t_2/t_1$) of the largest partition wall thickness ($t_2$) to the smallest partition wall thickness ($t_1$) is preferably 1.05 to 2.00, more preferably 1.10 to 1.50, particularly preferably 1.20 to 1.30.

When the ratio ($t_2/t_1$) of the largest partition wall thickness ($t_2$) to the smallest partition wall thickness ($t_1$) is less than 1.05, it may be difficult to obtain a desired erosion resistance. Meanwhile, when the ratio ($t_2/t_1$) is larger than 1.5, the drawback of reduction in warm-up property due to increase in heat capacity may be larger than the effect of enhancement in erosion resistance; moreover, the difference in extrusion speed between the partition walls of smallest thickness and the partition walls of largest thickness becomes large during extrusion molding, which may result in reduced moldability.

In particular, when an average partition wall thickness of 0.1 mm or less is employed in response to the recent year's requirements, the flow resistance of thin partition walls is very large; therefore, when the ratio of the largest partition wall thickness to the smallest partition wall thickness is outside the above-mentioned range, the difference in extrusion speed is extremely large and there may occur such deformation as can not be overlooked.

Incidentally, when the ratio of the largest partition wall thickness to the smallest partition wall thickness is outside the above-mentioned range, fluctuations of drying rate and firing rate are large during drying and firing, which may incur cracks and breakage caused by shrinkage stress.

However, in the case of a filter for exhaust gas purification wherein fine particles are moved by partition walls, the partition walls are preferred to have a thickness of 0.2 to 0.5 mm. The partition walls are also preferred to have a porosity of 40% or more in order to obtain a desired filtrability. Incidentally, in a filter for exhaust gas purification having a large porosity for desired filtrability, a larger erosion resistance is required and, in a filter for exclusive use in diesel vehicle, the requirement for erosion resistance is large because the filter is used under severe environmental conditions (a large amount of foreign matter derived from oxide scale, oil ash, etc. collides with the partition walls). However, such a requirement can be met by using the honeycomb structure of the present invention.

In the first honeycomb structure, the proportions of partition walls having a thickness larger than the average partition wall thickness and partition walls having a thickness smaller than the average partition wall thickness, in total partition walls (partition walls having a thickness larger than the average partition wall thickness:partition walls having a thickness smaller than the average partition wall thickness) are preferably 1:1 to 1:3, more preferably 1:2 to 1:2.5. When the proportions are smaller than 1:1, a drawback of the reduction in warm-up property due to increase in heat capacity may become larger; when the proportions are larger than 1:3, it may be difficult to obtain a desired erosion resistance.

Preferably, the first honeycomb structure is molded in an integrated form of outer peripheral wall and partition walls by extrusion molding, for a high productivity and a low cost. As the method for allowing partition walls to have a larger thickness, there can be mentioned, for example, a method of subjecting a molding die having a uniform slit width, to electric spark machining at the die portions corresponding to the larger thickness partition wall portions of honeycomb structure to obtain a die having desired slit widths, and then conducting extrusion molding using the die; and a method of applying plating to a molding die having a uniform slit width to obtain a die in which the thickness of plating is small at the die portions corresponding to the larger thickness partition wall portions of honeycomb structure, and then conducting extrusion molding using the die.

In the first honeycomb structure, there is no particular restriction as to the thickness of outer peripheral wall. However, when the proportion of thin partition walls having a thickness smaller than the average partition wall thickness is higher than the proportion of partition walls having a thickness larger than the average partition wall thickness, in the vicinity of the outer peripheral portion of honeycomb structure, the thickness of outer peripheral wall is preferred to be at least two times the partition wall thickness in order to increase the strength of whole honeycomb structure. When an exhaust gas hits the outer peripheral wall of honeycomb structure or when foreign matter slides on the area of honeycomb structure end face including the outer peripheral area, the outer peripheral wall is preferred to be even thicker.

There is no particular restriction as to the material for the first honeycomb structure. There can be mentioned, for example, at least one kind of ceramic material selected from the group consisting of cordierite, alumina, mullite, lithium aluminum silicate, aluminum titanate, titania, zirconia, silicon nitride, aluminum nitride and silicon carbide; a composite material thereof; and an adsorptive material such as active carbon, silica gel, zeolite or the like. A heat-resistant metal material such as stainless steel or the like may also be used.

As mentioned above, when the average partition wall thickness of honeycomb structure is as small as 0.1 mm or less, the honeycomb structure is low in mechanical strength and erosion resistance; therefore, in such a case, the material for honeycomb structure is preferred to be densified (about 10 to 25% in porosity) for enhancement in mechanical strength and erosion resistance.

In this case, the honeycomb structure may be densified in the whole portion or locally (part of the end face). However, the honeycomb structure is preferably densified in the whole portion because it can enhance the mechanical strength to canning and the total mechanical strength and further can prevent the temperature increase caused by an increase in heat capacity. When the honeycomb structure is densified locally, the discontinuity between the densified portion and other portion may incur a reduction in thermal shock resistance; therefore, the density of honeycomb structure is preferred to be continuously gradient. Since excessive densification may invite a reduction in thermal shock resistance owing to an increase in thermal expansion coefficient, the porosity is preferred to be controlled in the above-mentioned range.

In the first honeycomb structure, it is preferred to load a catalyst component on the plurality of partition walls. As the catalyst component, there can be mentioned, for example, Pt, Pd and Rh. The first honeycomb structure can be made into a honeycomb filter by plugging the through-holes alternately at each end face, using a plugging material. There is no particular restriction as to the plugging material, and there can be used, for example, the same material as the above-mentioned material used for the first honeycomb structure.

2. Second Honeycomb Structure

The second honeycomb structure of the present invention is a honeycomb structure having a plurality of through-holes which are divided by a plurality f partition walls and extend in the axial direction, wherein the plurality of partition walls are constituted by a plurality of partition walls having different thicknesses, and partition walls having a thickness larger than the average thickness of all partition walls and partition walls having a thickness smaller than the average partition wall thickness are provided irregularly.

Thereby, the erosion resistance of the second honeycomb structure can be enhanced effectively even under such conditions that the foreign matter in exhaust gas collides with individual partition walls unpredictably and irregularly. Further, the thermal shock resistance can be increased by relaxation of the concentration of thermal stress.

The second honeycomb structure is the same as the above-mentioned first honeycomb structure except that the partition walls having a thickness larger than the average partition wall thickness and the partition walls having a thickness smaller than the average partition wall thickness are provided irregularly. Therefore, no description is made here on the common points.

In the second honeycomb structure, the proportion of the partition walls having a thickness larger than the average partition wall thickness and the proportion of the partition walls having a thickness smaller than the average partition wall thickness, in the whole structure may be different as in the above-mentioned first honeycomb structure. However, the proportions are preferred to be uniform in the whole structure when injection of exhaust gas is made on the whole area of honeycomb structure end face.

Figure 19:
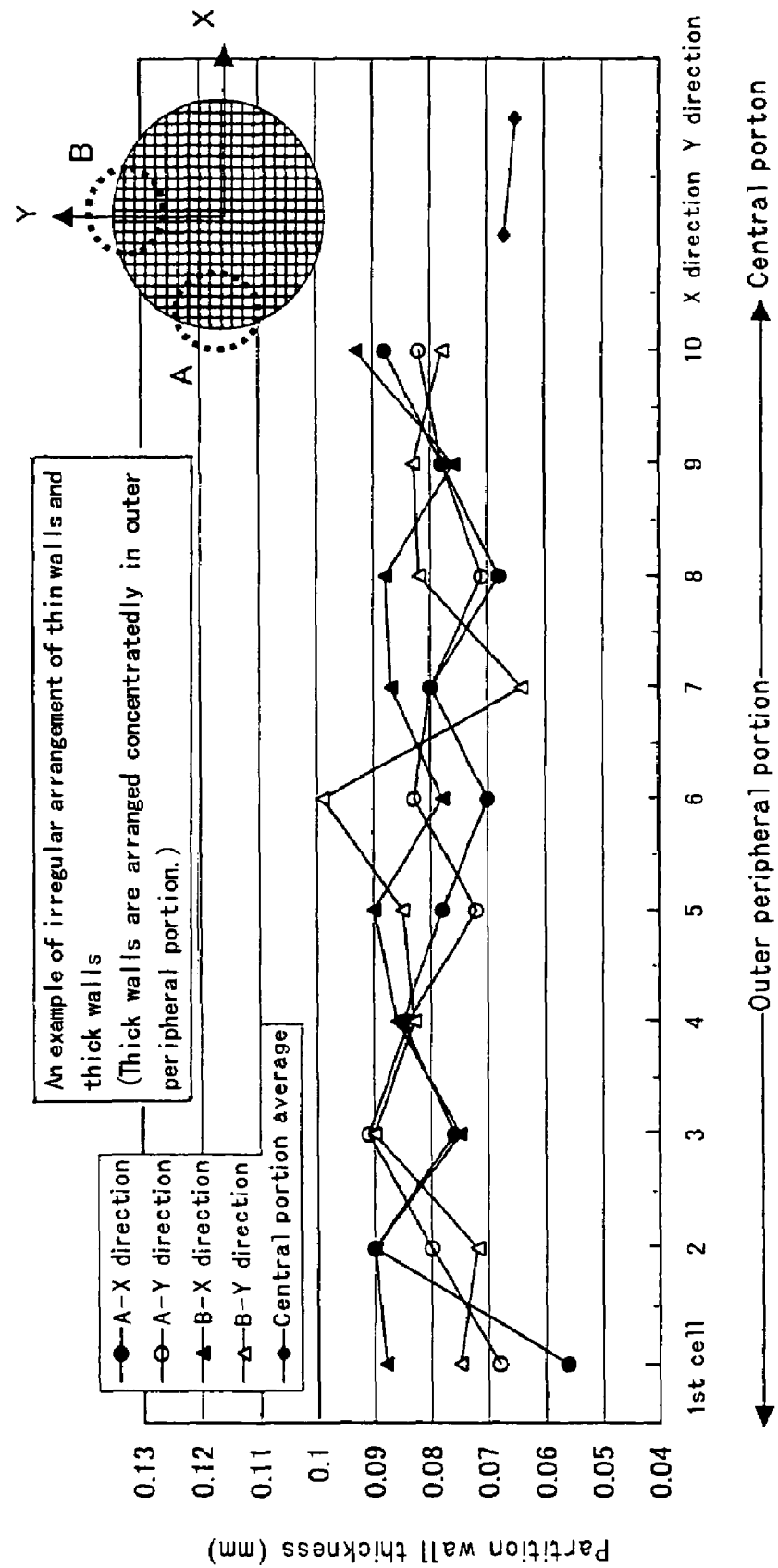
FIG. 19 is a graph showing one example in which the thicknesses of partition walls are changed irregularly in the honeycomb structure of the present invention.

Irregular arrangement of partition wall thicknesses can be determined by, for example, the chaos theory. As a specific example, there can be mentioned an irregular arrangement in which partition wall thicknesses are changed as shown in FIG. 19.

3. Converter System

As shown in FIGS. 1 to 4, the converter system of the present invention comprises the above-mentioned first or second honeycomb structure 10 (the second honeycomb structure is not shown) or an exhaust gas purification filter (not shown), an exhaust gas inlet pipe 5 for introducing an exhaust gas into the first or second honeycomb structure 10 or the like, a case for holding the first or second honeycomb structure or the like and the exhaust gas inlet pipe 5, and a cone section 7 which is connected to the case 6 and to which the exhaust gas inlet pipe 5 is connected.

In the converter system of the present invention, when it comprises the first honeycomb structure 10 or a honeycomb filter using the structure 10, the partition walls 2 provided in the honeycomb structure 10 or the like, having a thickness larger than the average partition wall thickness are provided in at least the exhaust gas-injected area of honeycomb structure end face and part of the foreign matter-sliding area and the partition walls 1 having a thickness smaller than the average partition wall thickness are provided in at least part of the end face area other than the exhaust gas-injected area; therefore, the converter system is superior in erosion resistance and thermal shock resistance and can exhibit a desired warm-up property even when the system is mounted right below an exhaust manifold.

Also, when the present converter system comprises the second honeycomb structure or a honeycomb filter using the structure, the partition walls having a thickness larger than the average partition wall thickness and the partition walls having a thickness smaller than the average partition wall thickness are provided irregularly; therefore, the converter system can have an effectively enhanced corrosion resistance and an increased thermal shock resistance brought about by relaxation of thermal stress concentration, even under such conditions that the foreign matter in exhaust gas collides with the partition walls unpredictably and irregularly.

Hereinafter, the present invention is described specifically by way of Example. However, the present invention is in no way restricted by the Example.

EXAMPLE AND COMPARATIVE EXAMPLE

Example 1

By applying plating in different thicknesses, there was produced a molding die having slit widths corresponding to the different partition wall thicknesses of a honeycomb structure to be produced. Using the die, extrusion molding was conducted to produce a cordierite-based honeycomb structure having a circular sectional shape, a porosity of 40%, a diameter of 100 mm and a length of 100 mm, wherein the sectional shape of through-holes was a square, the cell density was 900 cpsi (cell pitch: 0.84 mm), the relatively thin partition walls had a thickness of 0.065 mm (2.5 mil), the relatively thick partition walls had a thickness of 0.076 mm (3.0 mil), the ratio of the thickness of relatively thick partition walls to the thickness of relatively thin partition walls was 1.15 and, in two crescent honeycomb structure portions facing with each other, both located near the outer peripheral portion and containing maximum 20 cells in the direction extending from the outer peripheral surface to the honeycomb structure center, only those partition walls forming through-holes of the positions corresponding to a line normal to the outer peripheral surface of honeycomb structure and having an angle of 70 to 110° to the normal line were constituted by thick partition walls of 0.076 mm (3.0 mil).

Comparative Example 1

A cordierite-based honeycomb structure was produced in the same manner as in Example 1 except that a relatively thin partition wall and a relatively thick partition wall were provided alternately in the whole honeycomb structure.

(Method of Evaluation)

A converter system shown in FIG. 2 was used. Into a cast iron-made exhaust manifold provided with a foreign matter inlet was fed a given amount of foreign matter periodically, and an exhaust gas was injected on the exhaust gas-injected end face of a honeycomb structure placed inside the above converter system. The areas onto which the exhaust gas was injected, were two crescent areas of the exhaust gas-injected end face of honeycomb structure near the outer peripheral area, which faced each other as shown in FIG. 7. The foreign matter carried by the flow of the exhaust gas was allowed to repeatedly collide mainly with the partition walls provided in the above areas, whereby an erosion test was conducted to evaluate the erosion resistance of the honeycomb structure.

The foreign matter used was a pseudo foreign matter simulating oxide scale, and a commercial GC (SiC) abrasive (average particle diameter: 50 μm) was used. The amount of erosion generated was measured by filling the honeycomb structures before and after the erosion test with beads, determining the beads-filled volumes of honeycomb structure before and after the erosion test, and calculating the difference in the two volumes. Incidentally, there was no foreign matter remaining on the exhaust gas-injected end face of honeycomb structure after the test.

(Result of Evaluation)

The above erosion test was conducted using honeycomb structures obtained by loading a catalyst component on each of the honeycomb structures produced in Example 1 and Comparative Example 1. As a result, the erosion resistance in the honeycomb structure of Example 1 was improved by about 40% as compared with that in the honeycomb structure of Comparative Example 1.

Incidentally, the same test was conducted by changing the amount of catalyst loaded, in each of the above honeycomb structures. A similar result was obtained.

INDUSTRIAL APPLICABILITY

As described above, according to the present invention there can be provided a honeycomb structure, etc., all of which satisfy the recent year's requirements of increased warm-up property connected with purification ability and reduction in the amount of harmful substance emitted right after engine start and yet have a sufficient mechanical strength to external pressure, a large erosion resistance and a large thermal shock resistance.

The invention claimed is:

1. A honeycomb structure in which a plurality of through-holes extending in the axial direction are formed by a plurality of partition walls, characterized in that
said plurality of partition walls are constituted by a plurality of partition walls having different thicknesses, and
of said plurality of partition walls having different thicknesses, those partition walls having a thickness larger than the average thickness of all partition walls are provided at a higher proportion in a particular portion of the honeycomb structure whole portion having partition walls than in other portions,
wherein:
the thickness of the partition walls increases in a first direction along a first part of a first path extending from an interior portion of the honeycomb structure to a first exterior portion of the honeycomb structure, the thickness of the partition walls also decreases in the first direction along a second part of the first path, the first and second parts of the first path each extending across a plurality of through-holes;
the thickness of the partition walls increases in a second direction along a first part of a second path extending from the interior portion of the honeycomb structure to a second exterior portion of the honeycomb structure, the thickness of the partition walls also decreases in the second direction along a second part of the second path, the first and second parts of the second path each extending across a plurality of through-holes; and
the first direction is opposite to the second direction.

2. A honeycomb structure in which a plurality of through-holes extending in the axial direction are formed by a plurality of partition walls, characterized in that
said plurality of partition walls are constituted by a plurality of partition walls having different thicknesses, and
a partition wall group consisting of those partition walls having a thickness larger than the average thickness of all partition walls and those partition walls having a thickness smaller than the average partition wall thickness is provided in a particular portion of the honeycomb structure whole portion having partition walls, and a partition wall group consisting only of partition walls having a thickness smaller than the average partition wall thickness is provided in other portions.
wherein:
the thickness of the partition walls increases in a first direction along a first part of a first path extending from an interior portion of the honeycomb structure to a first exterior portion of the honeycomb structure, the thickness of the partition walls also decreases in the first direction along a second part of the first path, the first and second parts of the first oath each extending across a plurality of through-holes;
the thickness of the partition walls increases in a second direction along a first part of a second path extending from the interior portion of the honeycomb structure to a second exterior portion of the honeycomb structure, the thickness of the partition walls also decreases in the second direction along a second part of the second path, the first and second parts of the second path each extending across a plurality of through-holes; and
the first direction is opposite to the second direction.

3. A honeycomb structure according to claim 2, wherein the partition wall group consisting of those partition walls having a thickness larger than the average thickness of all partition walls and those partition walls having a thickness smaller than the average partition wall thickness is provided so as to include at least part of the honeycomb structure portion near the outer peripheral portion of honeycomb structure, and the partition wall group consisting only of partition walls having a thickness smaller than the average partition wall thickness is provided so as to include a honeycomb structure central portion located inside the honeycomb structure portion near the outer peripheral portion of honeycomb structure.

4. A honeycomb structure according to claim 2, wherein the partition wall group consisting only of partition walls having a thickness smaller than the average partition wall thickness is provided so as to include at least part of the honeycomb structure portion near the outer Peripheral portion of honeycomb structure, and the partition wall group consisting of those partition walls having a thickness larger than the average partition wall thickness and those partition walls having a thickness smaller than the average partition wall thickness is provided so as to include a honeycomb structure central portion located inside the honeycomb structure portion near the outer peripheral portion of honeycomb structure.

5. A honeycomb structure in which a plurality of through-holes extending in the axial direction are formed by a plurality of partition walls, characterized in that
said plurality of partition walls are constituted by a plurality of partition walls having different thicknesses, and
a partition wall group consisting only of partition walls having a thickness smaller than the average thickness of all partition walls is provided so as to include at least part of the honeycomb structure portion near the outer peripheral portion of honeycomb structure, and a partition wall group consisting only of partition walls having a thickness larger than the average partition wall thickness is provided so as to include the central portion of honeycomb structure located inside the honeycomb portion near the outer peripheral portion of honeycomb structure,
wherein:
the thickness of the partition walls increases in a first direction along a first part of a first path extending from an interior portion of the honeycomb structure to a first exterior portion of the honeycomb structure, the thickness of the partition walls also decreases in the first direction along a second part of the first path, the first and second parts of the first path each extending across a plurality of through-holes;
the thickness of the partition walls increases in a second direction along a first part of a second path extending from the interior portion of the honeycomb structure to a second exterior portion of the honeycomb structure, the thickness of the partition walls also decreases in the second direction along a second part of the second path, the first and second parts of the second path each extending across a plurality of through-holes; and the first direction is opposite to the second direction.

6. A honeycomb structure according to claim 5, wherein the plurality of partition walls have such thicknesses as decrease stepwise or continuously from the central portion of honeycomb structure towards the outer periphery of honeycomb structure.

7. A honeycomb structure in which a plurality of through-holes extending in the axial direction are formed by a plurality of partition walls, characterized in that in the whole portion of honeycomb structure in which said plurality of partition walls are provided, those partition walls having a thickness larger than the average thickness of all partition walls and those partition walls having a thickness smaller than the average partition wall thickness are provided in a mixed state, and a partition wall group containing those partition walls having a thickness larger than the average partition wall thickness, relatively in a large amount is provided in a particular portion of honeycomb structure, and a partition wall group containing those partition walls having a thickness smaller than the average partition wall, relatively in a large amount is provided in other portions, wherein:

the thickness of the partition walls increases in a first direction along a first part of a first path extending from an interior portion of the honeycomb structure to a first exterior portion of the honeycomb structure, the thickness of the partition walls also decreases in the first direction along a second part of the first path, the first and second parts of the first path each extending across a plurality of through-holes;

the thickness of the partition walls increases in a second direction along a first part of a second path extending from the interior portion of the honeycomb structure to a second exterior portion of the honeycomb structure, the thickness of the partition walls also decreases in the second direction along a second part of the second path, the first and second parts of the second path each extending across a plurality of through-holes; and the first direction is opposite to the second direction.

8. A honeycomb structure according to claim 7, wherein a proportion of the partition walls having a thickness smaller than the average partition wall thickness increases stepwise or continuously from the central portion of honeycomb structure towards the outer periphery of honeycomb structure.

9. A honeycomb structure in which a plurality of through-holes extending in the axial direction are formed by a plurality of partition walls, characterized in that said plurality of partition walls are constituted by a plurality of partition walls having different thicknesses, and partition walls having a thickness larger than the average thickness of all partition walls and partition walls having a thickness smaller than the average partition wall thickness are provided irregularly, wherein:

the thickness of the partition walls increases in a first direction along a first part of a first path extending from an interior portion of the honeycomb structure to a first exterior portion of the honeycomb structure, the thickness of the partition walls also decreases in the first direction along a second part of the first path, the first and second parts of the first path each extending across a plurality of through-holes;

the thickness of the partition walls increases in a second direction along a first part of a second path extending from the interior portion of the honeycomb structure to a second exterior portion of the honeycomb structure, the thickness of the partition walls also decreases in the second direction along a second part of the second path, the first and second parts of the second path each extending across a plurality of through-holes; and the first direction is opposite to the second direction.

10. A honeycomb filter obtained by plugging, with a plugging agent, the through-holes of a honeycomb structure set forth in claim 1, alternately at each end face of the honeycomb structure.

11. A honeycomb filter obtained by plugging, with a plugging agent, the through-holes of a honeycomb structure set forth in claim 2, alternately at each end face of the honeycomb structure.

12. A honeycomb filter obtained by plugging, with a plugging agent, the through-holes of a honeycomb structure set forth in claim 5, alternately at each end face of the honeycomb structure.

13. A honeycomb filter obtained by plugging, with a plugging agent, the through-holes of a honeycomb structure set forth in claim 7, alternately at each end face of the honeycomb structure.

14. A honeycomb filter obtained by plugging, with a plugging agent, the through-holes of a honeycomb structure set forth in claim 9, alternately at each end face of the honeycomb structure.

15. A converter system comprising a honeycomb structure or honeycomb filter set forth in claim 1, an exhaust gas inlet pipe for introducing an exhaust gas into the honeycomb structure or honeycomb filter, a case for holding the honeycomb structure or honeycomb filter, and a cone section which is connected to the case and to which the exhaust gas inlet pipe is connected.

16. A converter system comprising a honeycomb structure or honeycomb filter set forth in claim 2, an exhaust gas inlet pipe for introducing an exhaust gas into the honeycomb structure or honeycomb filter, a case for holding the honeycomb structure or honeycomb filter, and a cone section which is connected to the case and to which the exhaust gas inlet pipe is connected.

17. A converter system comprising a honeycomb structure or honeycomb filter set forth in claim 5, an exhaust gas inlet pipe for introducing an exhaust gas into the honeycomb structure or honeycomb filter, a case for holding the honeycomb structure or honeycomb filter, and a cone section which is connected to the case and to which the exhaust gas inlet pipe is connected.

18. A converter system comprising a honeycomb structure or honeycomb filter set forth in claim 7, an exhaust gas inlet pipe for introducing an exhaust gas into the honeycomb structure or honeycomb filter, a case for holding the honeycomb structure or honeycomb filter, and a cone section which is connected to the case and to which the exhaust gas inlet pipe is connected.

19. A converter system comprising a honeycomb structure or honeycomb filter set forth in claim 9, an exhaust gas inlet pipe for introducing an exhaust gas into the honeycomb structure or honeycomb filter, a case for holding the honeycomb structure or honeycomb filter, and a cone section which is connected to the case and to which the exhaust gas inlet pipe is connected.

20. A honeycomb structure in which a plurality of through-holes extending in the axial direction are formed by a plurality of partition walls, characterized in that
    said plurality of partition walls are constituted by a plurality of partition walls having different thicknesses, and
    of said plurality of partition walls having different thicknesses, those partition walls having a thickness larger than the average thickness of all partition walls are provided at a higher proportion in a particular portion of the honeycomb structure whole portion having partition walls than in other portions, wherein:
    the through-holes are substantially rectangular with a first pair of substantially parallel sides having a first thickness and second pair of substantially parallel sides having a second thickness, the first thickness being a constant;
    the second thickness decreases in a first direction along at least part of a first path extending from an interior portion of the honeycomb structure to a first exterior portion of the honeycomb structure;
    the second thickness remains unchanged in a second direction along at least part of a second path extending from the interior portion of the honeycomb structure to a second exterior portion of the honeycomb structure, the second direction being about 45° rotated from the first direction; and
    the second thickness decreases in a third direction along at least part of a third path extending from the interior portion of the honeycomb structure to a third exterior portion of the honeycomb structure, the third direction being about 45° rotated from the second direction and being substantially perpendicular to the first direction.

* * * * *